(12) United States Patent
Speier et al.

(10) Patent No.: US 12,524,238 B2
(45) Date of Patent: Jan. 13, 2026

(54) TECHNIQUE FOR CONTROLLING STASHING OF DATA

(71) Applicant: Arm Limited, Cambridge (GB)

(72) Inventors: Thomas Philip Speier, Wake Forest, NC (US); Klas Magnus Bruce, Leander, TX (US); Andrew Brookfield Swaine, Sheffield (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/610,064

(22) Filed: Mar. 19, 2024

(65) Prior Publication Data

US 2025/0298618 A1    Sep. 25, 2025

(51) Int. Cl.
G06F 9/30 (2018.01)

(52) U.S. Cl.
CPC ...... G06F 9/30145 (2013.01); G06F 9/30043 (2013.01)

(58) Field of Classification Search
CPC .......................... G06F 9/30145; G06F 9/30043
See application file for complete search history.

(56) References Cited

U.S. PATENT DOCUMENTS

| | | | |
|---|---|---|---|
| 10,452,593 B1 * | 10/2019 | Jalal | G06F 15/1735 |
| 2009/0157967 A1 | 6/2009 | Greiner et al. | |
| 2011/0283067 A1 | 11/2011 | Chen et al. | |
| 2016/0110203 A1 * | 4/2016 | Lai | G06F 9/3885 |
| | | | 712/220 |
| 2019/0129871 A1 * | 5/2019 | Carro | G06F 12/0811 |
| 2021/0306414 A1 * | 9/2021 | Beard | G06F 12/0826 |
| 2021/0374059 A1 * | 12/2021 | Joao | G06F 12/0895 |
| 2023/0101512 A1 | 3/2023 | Hughes et al. | |

OTHER PUBLICATIONS

U.S. Appl. No. 18/609,654, filed Mar. 19, 2024, Randall et al.
Robert Bedichek, "Some Efficient Architecture Simulation Techniques," Proceedings of the Winter 1990 USENIX Conference, Jan. 22-26, 1990, 12 pages.

(Continued)

*Primary Examiner* — Zachary K Huson
(74) *Attorney, Agent, or Firm* — NIXON & VANDERHYE P.C.

(57) ABSTRACT

An apparatus has decoder circuitry within a first processing element to decode instructions, in order to respond to a sequence of instructions by generating control signals. Processing circuitry within the first processing element is responsive to the control signals to perform operations defined by the sequence of instructions. The decoder circuitry is responsive to a stashee hint instruction in the sequence of instructions to issue control signals to cause the processing circuitry to issue a stash interest request via an interface used to couple the first processing element to interconnect circuitry. The stash interest request is arranged to provide a given memory address indication determined from the stashee hint instruction and to trigger stashing control circuitry accessible via the interconnect circuitry to cause updated data associated with the given memory address indication to be made available for stashing in an associated storage structure of the first processing element.

19 Claims, 16 Drawing Sheets

(56) References Cited

OTHER PUBLICATIONS

International Search Report and Written Opinion of the International Searching Authority for PCT/GB2025/050294 mailed May 12, 2025, 14 pages.
International Search Report and Written Opinion of the International Searching Authority for PCT/GB2025/050292 mailed May 23, 2025, 14 pages.
Office Action dated May 6, 2025 for U.S. Appl. No. 18/609,654, 12 pages.

* cited by examiner

STASH HINT INSTRUCTION

| OPCODE | STASHING CONTROL INFORMATION (E.G. CONSUMER ID) |

SNOOP FILTER STORAGE (STASHING CONTROL INFORMATION DERIVED FROM SNOOP FILTER INFO)

| ADDRESS INDICATION | PROCESSING ELEMENTS THAT MAY HAVE CACHED COPY OF DATA | | | |
|---|---|---|---|---|
| | PE 0 | PE 1 | PE 2 | PE 3 |
| 0x.... | ✓ | ✗ | ✓ | ✗ |
| | | | | |
| ⋮ | | | | |
| | | | | |

STASHING CONTROL STORAGE (STASHING CONTROL INFORMATION INDICATED BY CONSUMER REGISTRATION)

| ADDRESS INDICATION | PROCESSING ELEMENTS THAT HAVE REGISTERED INTENT TO READ DATA | | | |
|---|---|---|---|---|
| | PE 0 | PE 1 | PE 2 | PE 3 |
| 0x.... | | | ✓ | |
| | | | | |
| ⋮ | | | | |
| | | | | |

TECHNIQUE FOR CONTROLLING STASHING OF DATA

BACKGROUND

The present technique relates to the field of data processing, and more particularly to techniques for facilitating the stashing of data generated within a data processing system.

In a data processing system, a number of components may be interconnected by interconnect circuitry, in order to allow communication between those components. The components may include a number of processing elements (for example central processing units (CPUs), graphics processing units (GPUs), accelerator devices, PCIe components/bridges, etc.) that can perform data processing operations, with the data processed by those processing elements being accessible in memory accessed by those processing elements via the interconnect circuitry.

In some instances, it may be required that the data produced by one of the processing elements needs to be made available to at least one of the other processing elements (for example a processing element may be arranged to perform a number of processing tasks on behalf of another processing element, and as a result generate data that the other processing element may subsequently require). One way to make that data available to the other processing element is for the processing element generating that data to write the data to a location in memory that is also accessible to the other processing element that subsequently requires that data. However, there can be significant latency associated with performing accesses to memory, along with significant energy consumption associated with such accesses.

In order to alleviate such issues, it is known to provide mechanisms that allow data generated by a first processing element to be stored directly into a local storage structure (for example a cache) of a second processing element (i.e. without the second processing unit needing to read that data from memory), this process being referred to as stashing the data. Such an approach thereby reduces the latency associated with the second processing element subsequently seeking to access that data, and can also reduce energy consumption by reducing the need to access main memory.

However, it is difficult for hardware to detect scenarios where it would be appropriate to stash the data generated by one processing device in a local storage structure of another processing device.

SUMMARY

In accordance with a first example arrangement, there is provided an apparatus comprising: decoder circuitry within a first processing element to decode instructions, wherein the decoder circuitry is responsive to a sequence of instructions to generate control signals; processing circuitry within the first processing element that is responsive to the control signals to perform operations defined by the sequence of instructions; and an interface to couple the first processing element to interconnect circuitry; wherein: the decoder circuitry is responsive to a stashee hint instruction in the sequence of instructions to issue control signals to cause the processing circuitry to issue a stash interest request via the interface, wherein the stash interest request is arranged to provide a given memory address indication determined from the stashee hint instruction and to trigger stashing control circuitry accessible via the interconnect circuitry to cause updated data associated with the given memory address indication to be made available for stashing in an associated storage structure of the first processing element.

In accordance with another example arrangement, there is provided a method of controlling stashing of data, comprising: decoding a sequence of instructions within decoder circuitry of a first processing element in order to generate control signals; responsive to the control signals, performing within processing circuitry of the first processing element operations defined by the sequence of instructions; in response to a stashee hint instruction in the sequence of instructions, issuing from the decoder circuitry control signals that cause the processing circuitry to issue a stash interest request via an interface used to couple the first processing element to interconnect circuitry, wherein the stash interest request provides a given memory address indication determined from the stashee hint instruction; and in response to the stash interest request, triggering stashing control circuitry accessible via the interconnect circuitry to cause updated data associated with the given memory address indication to be made available for stashing in an associated storage structure of the first processing element.

In accordance with a still further example arrangement, there is provided a computer program comprising instructions which, when executed by a host data processing apparatus, control the host data processing apparatus to provide an instruction execution environment for executing target program code, the computer program comprising: instruction decoding program logic associated with a first processing element to decode instructions, wherein the instruction decoding program logic is responsive to a sequence of instructions to generate control signals; and data processing program logic associated with the first processing element to be responsive to the control signals to perform operations defined by the sequence of instructions; wherein: the instruction decoding program logic is responsive to a stashee hint instruction in the sequence of instructions to issue control signals to cause the data processing program logic to issue a stash interest request to interconnect program logic, wherein the stash interest request is arranged to provide a given memory address indication determined from the stashee hint instruction, and to trigger stashing control program logic accessible via the interconnect program logic to cause updated data associated with the given memory address indication to be made available for stashing in storage emulating program logic used to emulate an associated storage structure of the first processing element. Such a computer program can be disposed in any known transitory computer-readable medium (such as wired or wireless transmission of code over a network) or non-transitory computer-readable medium such as semiconductor, magnetic disk, or optical disc.

In a yet further example arrangement, there is provided a computer-readable medium storing computer-readable code for fabrication of an apparatus in accordance with the first example arrangement discussed above. The computer-readable medium may be a transitory computer-readable medium or a non-transitory computer-readable medium.

BRIEF DESCRIPTION OF THE DRAWINGS

Further aspects, features and advantages of the present technique will be apparent from the following description of examples, which is to be read in conjunction with the accompanying drawings, in which:

FIGS. 4A to 4C illustrate different mechanisms by which stashing control information may be provided;

DESCRIPTION OF EXAMPLES

Figure 1:
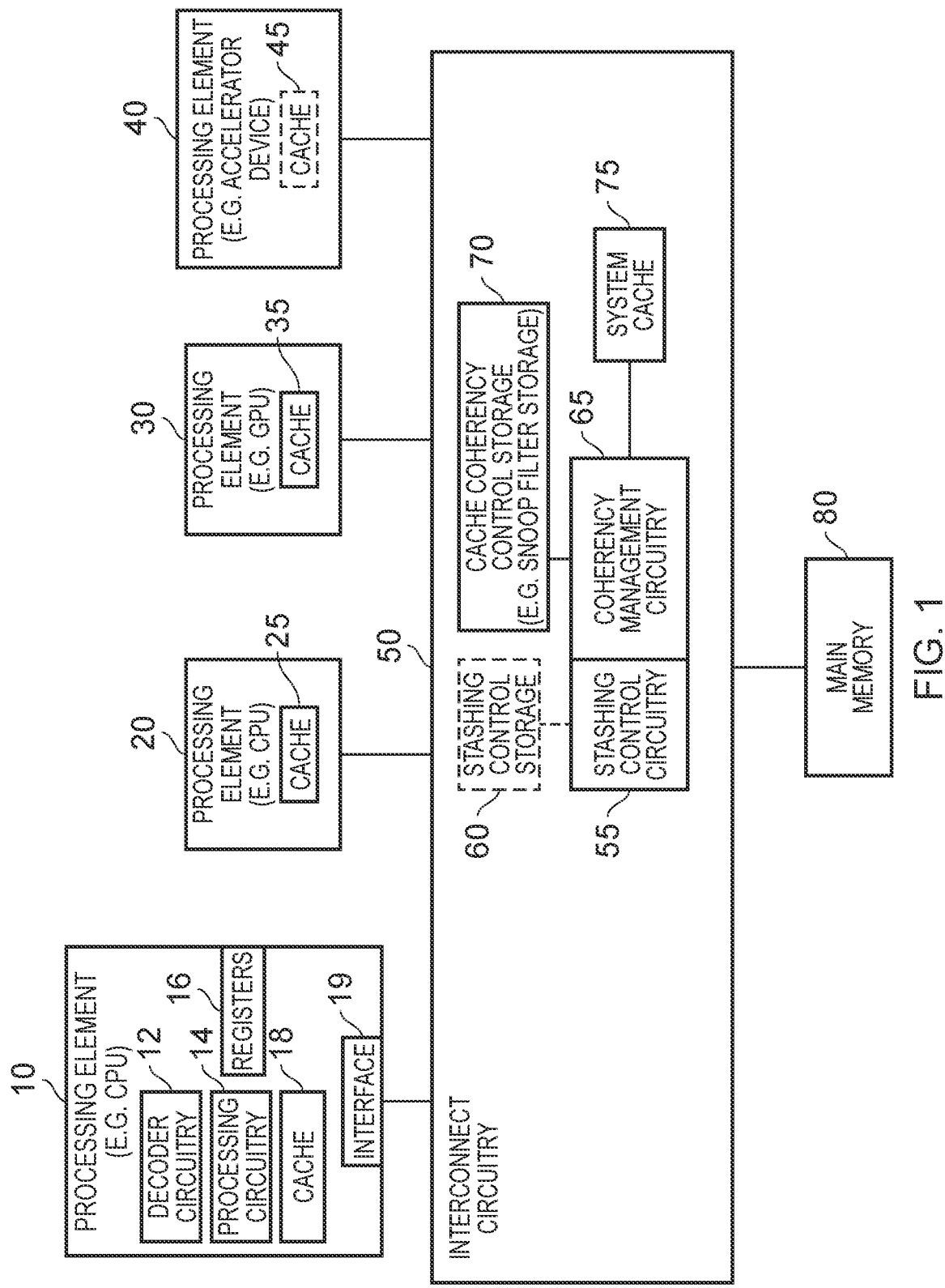
FIG. 1 is a block diagram of a data processing system in which the techniques described herein may be employed.

In accordance with one example implementation, an apparatus is provided that has decoder circuitry within a first processing element to decode instructions, the decoder circuitry being responsive to a sequence of instructions to generate control signals. The apparatus also has processing circuitry within the first processing element that is responsive to the control signals to perform operations defined by the sequence of instructions, and an interface to couple the first processing element to interconnect circuitry. In accordance with the techniques described herein the decoder circuitry is responsive to a stashee hint instruction in the sequence of instructions to issue control signals to cause the processing circuitry to issue a stash interest request via the interface. The stash interest request is arranged to provide a given memory address indication determined from the stashee hint instruction, and to trigger stashing control circuitry accessible via the interconnect circuitry to cause updated data associated with the given memory address indication to be made available for stashing in an associated storage structure of the first processing element.

The given memory address indication may directly specify a memory address, or may provide information from which a memory address can be derived, for example by providing an offset to be applied to a base address, and the use of the above technique can cause updated data for that determined memory address to be made available for stashing in the associated storage structure of the first processing element. Further, whilst the memory address indication may identify a specific memory address (for example associated with a particular item of data, or with a block of data items whose collective size is the size of a single cache line) it may alternatively identify an address range covering multiple such blocks of data.

It should be noted that the timing of the issuance of the stash interest request can be decoupled from the timing at which the updated data that the first processing element has an interest in being stashed in its associated storage structure is generated. For example, the stashee hint instruction may be executed by the first processing element before the updated data for the memory address in question has been generated, with the resultant stash interest request being processed by the stashing control circuitry to register the first processing element's interest in having the updated data made available for stashing when in due course that updated data is generated. Hence, the use of the stashee hint instruction can enable the first processing element to register an interest in reading the updated data for a specified memory address when that updated data becomes available.

Such an approach can be useful in a wide variety of situations. For example, it is often the case that another processing element may be generating that updated data, and it is difficult for the hardware to determine that the first processing element could benefit from having that updated data stashed in its associated storage structure. Through use of the above-mentioned stashee hint instruction this can enable a processing element to register its interest in having data associated with a particular memory address stashed in its associated storage structure. The provision of such a stashee hint instruction hence enables a programmer, library or compiler to indicate a situation where there is an expectation that a first thread executing on a processing element will benefit from having updated data generated by another thread (which may for example be executing on a different processing element) stashed in its associated storage structure, by arranging for that first thread to execute an instance of the stashee hint instruction. By executing the stashee hint instruction and hence registering an interest in having updated data for a given memory address stashed, this enables the hardware to seek to reduce the latency associated with the reading of that updated data through the adoption of a stashing mechanism to seek to stash the updated data in a suitable storage structure for access by the processing element executing the first thread. This can result in significantly reduced latency and improved throughput in a data processing system.

The associated storage structure in which the updated data is made available for stashing may take a variety of forms, but in one example implementation may take the form of a cache used to store data for access by the processing element that that cache is associated with.

In one example implementation the stashing control circuitry is arranged, following receipt of the stash interest request, to be responsive to a data update transaction initiated by a further processing element coupled to the interconnect circuitry indicating that the updated data is being generated, to issue one or more stashing control signals to the first processing element to enable the updated data to be stashed in the associated storage structure of the first processing element. The data update transaction can take a variety of forms, and in some examples may specify the updated data in the request used to initiate the data update transaction, whilst in other examples the updated data may be requested from the further processing element later during the processing of the data update transaction. Indeed, in other examples, the further processing element may itself not generate the updated data but may provide, either when initiating the data update transaction or when subsequently requested to do so, one or more source operands needed to compute the updated data, with the updated data then being generated elsewhere within the system.

There are a number of ways in which the stashing control circuitry may be arranged to determine which associated storage structure or associated storage structures to make the updated data available for stashing in. However, in one example implementation the apparatus further comprises a stashing control storage to maintain stashing control information for reference by the stashing control circuitry. The stashing control storage may be arranged to maintain, as the stashing control information, one or more memory address indications and, for each memory address indication, an indication of one or more processing elements coupled to the interconnect circuitry that have an associated storage structure and have registered an interest in having the data associated with that memory address indication stashed in their associated storage structure. The stashing control circuitry may then be arranged to reference the stashing control storage to determine, for a given item of updated data, whether any processing elements coupled to the interconnect circuitry should be sent stashing control signals to enable that given item of updated data to be stashed in their associated storage structure. The use of such a stashing control storage can provide an efficient mechanism for keeping track of stash interest requests issued by multiple processing elements and/or issued in respect of multiple memory addresses.

In one example implementation, the stashing control circuitry is responsive to the stash interest request issued by the processing circuitry of the first processing element, to cause the stashing control information maintained in the stashing control storage to be updated to identify that, for the given memory address indication, the first processing element has registered an interest in having the data associated with that given memory address indication stashed in its associated storage structure.

In one example implementation, the stashing control circuitry may be arranged, responsive to the stash interest request, to determine whether any processing element coupled to the interconnect circuitry is a candidate processing element for generating the updated data without the stashing control circuitry being aware, and in that event to issue a notification control signal to the candidate processing element identifying that, in the event that candidate processing element causes the updated data to be generated, the candidate processing element is to notify the stashing control circuitry to enable the updated data to be made available for stashing in the associated storage structure of the first processing element. This can ensure that, in such a situation, the updated data will still be made available for stashing when that updated data is generated.

In one particular example implementation, the stashing control circuitry may be arranged to identify as the candidate processing element a processing element that is understood to be storing in its associated storage structure a copy of data associated with the given memory address indication in a unique state indicating that the candidate processing element is the only processing element coupled to the interconnect circuitry that is storing in its associated storage structure a valid copy of data associated with the given memory address indication. For example, considering an implementation where the associated storage structures are caches, a cache coherency protocol can be employed to ensure that each processing element is provided with a coherent view of data, and in accordance with such a cache coherency protocol it may be possible for data cached in a cache to be cached in one of a number of different states (with coherency control storage being maintained to keep track of the state in which data is stored in the various caches). Purely by way of example, if multiple processing elements have a cached copy of data for a given memory address, then each of those cached copies may be marked as being in the shared state, and if one processing element seeks to update the data it will need to notify cache coherency circuitry to ensure that steps are taken to ensure coherency of the data (for example by causing other processing elements that have a cached copy of the data to invalidate their copies). However, if only one processing element has a cached copy of data for a given memory address, it may be allowed to hold that cached copy in a unique state, and because the data is in the unique state that processing element may be allowed to update its cached copy without notifying the cache coherency circuitry. Hence, in accordance with the above technique, if the stashing control circuitry determines that there is a processing element that currently has a cached copy of data for the relevant memory address in the unique state, it may send the notification control signal to that processing element to identify that it needs to notify the stashing control circuitry if it updates the data.

If the stashing control circuitry does use the above mechanism to inform a processing element that it needs to notify the stashing control circuitry if it updates the data for a specified memory address, then the stashing control circuitry may still decide to update the stashing control storage in response to the stash interest request, in order to track the first processing element's interest in having the updated data stashed. This ensures that that information is maintained for future reference, for example to determine in due course that it is the first processing element that should have the updated data made available for stashing in its associated storage structure. However, in some instances it may be determined unnecessary to also maintain the information in the stashing control storage. For example, if the above-mentioned notification control signal not only indicated that the processing element receiving that notification control signal should notify the stashing control circuitry when it generates updated data for the memory address in question, but also identifies that that processing element should identify when providing the updated data that the first processing element is the target for stashing, this may enable the stashing control circuitry to have sufficient information to identify which processing element to make the updated data available to for stashing without needing to reference the stashing control storage.

In one example implementation the apparatus further comprises interconnect circuitry to interconnect a plurality of processing elements that are coupled to the interconnect circuitry, the plurality of processing elements comprising at least the first processing element and the further processing element mentioned earlier. In such an example implementation, multiple processing elements amongst the plurality of processing elements may have associated storage structures, and the interconnect circuitry may be provided with coherency management circuitry to maintain coherency of data accessible by the multiple processing elements. In one such example implementation, the stashing control circuitry may be associated with the coherency management circuitry to cause the one or more stashing control signals to be integrated with coherency control signals issued by the coherency management circuitry to maintain coherency for the updated data. This can provide a particularly efficient implementation by using the communication paths already in place to support the issuance of coherency control signals to also disseminate the required stashing control signals.

In one example implementation, the apparatus may further comprise coherency control storage used to maintain a record, for each memory address of a plurality of memory addresses, of which associated storage structures may be storing a copy of the data associated with that memory address. In implementations where the associated storage structures are caches, then the coherency control storage may for example take the form of a snoop filter storage, which is typically used by cache coherency circuitry to determine which caches to issue snoop requests to in order to implement required cache coherency operations to make sure that all of the processing elements maintain a coherent view of data. It should be noted that such a snoop filter storage may not necessarily be fully accurate, for example due to a cache that did have a copy of a certain item of data no longer having a copy of that data, and this can result in some false positives where a snoop request is issued to a cache that no longer has a copy of the data in question. However, this does not affect correct operation but instead merely results in the occasional issuance of a snoop request that is not needed.

The coherency management circuitry may be arranged, responsive to determining with reference to the coherency control storage that a given processing element may have a copy of data associated with a memory address identified by the data update transaction, to issue a snoop request signal to the given processing element to cause a coherency action to be taken by the given processing element. Further, if the stashing control circuitry determines that the given processing element is the first processing element and has issued the stash interest request, the coherency management circuitry may be arranged to incorporate a stashing indication within the snoop request signal to enable the updated data to be stashed in the associated storage structure of the first processing element.

It should be noted that whilst the above described process may cause the coherency management circuitry to incorporate a stashing indication within a snoop request signal to enable the updated data to be stashed in the first processing element's associated storage structure, and this may typically cause the first processing element to stash that updated data, there is no obligation for the first processing element to stash the updated data. For instance, in some situations the first processing element could determine that it is no longer interested in the data and hence may decide not to stash the updated data. Hence, in some instances, the presence of the stashing indication may not itself cause stashing to occur, but instead may merely give the first processing element the option of stashing the updated data.

There are a number of ways in which the stashing control information can be made available to the stashing control circuitry. For example, a dedicated stashing control storage may be provided to maintain the stashing control information referenced by the stashing control circuitry. This dedicated stashing control storage could be a separate storage structure provided solely for the purpose of maintaining stashing control information. However, alternatively an existing storage structure may be arranged to incorporate the stashing control information. For instance, in one example implementation the coherency control storage may be arranged to provide the stashing control storage used to maintain the stashing control information for reference by the stashing control circuitry. This could for example be achieved by providing one or more further fields within the entries of the coherency control storage, to capture, for a given memory address allocated to an entry, an indication of any processing element that has registered an interest in reading the data associated with the given memory address.

There are a number of ways in which the stashing control circuitry may respond to the earlier-mentioned data update transaction initiated by the further processing element. For example, the stashing control circuitry may be arranged to send a data request signal to the further processing element in response to the data update transaction to cause the further processing element to make the updated data available for provision to the first processing element for stashing in its associated storage structure. It should be noted that this process may cause the further processing element to update the state associated with any cached copy it has of the data in question. For example, this may cause the cached state of that data to change from the unique state to the shared state.

In some instances, there may be no need to send such a data request signal to the further processing element, for instance if the further processing element has already provided the updated data as part of the request initiating the data update transaction, for example when the data update transaction is seeking to initiate an inline update of the data. When such an inline update is issued, the earlier-mentioned coherency management circuitry may be arranged to issue a snoop request signal to the first processing element that incorporates the updated data and indicates that the coherency action to be taken by the first processing element is an inline update of the data stored in the associated storage structure for the given memory address to match the updated data, to thereby cause the updated data to be stashed in the associated storage structure. Hence, in this case the stashing of the updated data is achieved by the form of snoop request signal issued to the first processing element, and there is no need for the first processing element to separately request the data to be stashed.

In some example implementations, the first processing element may be enabled to execute a sequence of instructions that includes multiple instances of the stashee hint instruction, each instance having an associated memory address indication, to thereby cause stash interest requests to be issued to trigger the stashing control circuitry to cause updated data associated with each of the associated memory address indications to be made available for stashing in the associated storage structure of the first processing element. Hence, there may be multiple live stash interest requests for any given processing element at any point in time.

Further, in some implementations, the apparatus may further comprise at least one additional processing element that is enabled to execute the stashee hint instruction, and the stashing control circuitry may be arranged to be responsive to each stash interest request issued by any of the first processing element and the at least one additional processing element to cause updated data associated with a memory address indication provided by that stash interest request to be made available for stashing in an associated storage structure of the processing element issuing that stash interest request. Hence, there may be multiple live stash interest requests from different processing elements at any point in time.

As mentioned previously, the associated storage structures discussed above can take a variety of forms, but in one example implementation each associated storage structure is a cache used to cache data for access by each processing element that has access to that associated storage structure.

There are a number of ways in which stash interest requests can be deregistered. In one example implementation, the stashing control circuitry may be arranged to consider the stash interest request no longer active once the updated data associated with the given memory address indication has been made available for stashing in the associated storage structure of the relevant processing element. Hence, any given stash interest request is considered to apply to one stashing event and hence the stashee registration would be cleared when the updated data has been made available for stashing once. However, in an alternative implementation each stash interest request may be considered to be active for multiple stashing events and only cleared once those multiple stashing events have occurred.

In another example implementation, the stashing control circuitry may be arranged to consider the stash interest request as active until a stash interest clearing event occurs. The stash interest clearing event can take a variety of forms. For example, the stash interest clearing event may comprise receipt by the stashing control circuitry of a stash interest removal request from the relevant processing circuitry providing the given memory address indication. For instance, the relevant processing circuitry (i.e. the one that had previously issued the stash interest request) may be able to execute a stash interest clearing instruction that causes the stash interest removal request to be generated. In other instances, the stash interest clearing event may arise without any notification from the relevant processing circuitry. Purely by way of example, the stashing control storage used to maintain stashing control information may be of a fixed size, and when new stashing control information is received then, if necessary, older stashing control information within the stashing control storage may be discarded to make room for the new stashing control information. In one particular example implementation, the stashing control storage may be arranged as a FIFO, such that the oldest stashing control information is the first to be discarded. Hence, if a given processing element has issued a stash interest request, causing an associated item of stashing control information to be added to the FIFO, but the updated data has not become available by the time that item of stashing control information needs to be discarded to make room for new stashing control information, then the discarding of the item of stashing control information for that stash interest request can be considered to be the stash interest clearing event.

It should be noted that the discarding of stashing control information does not affect correct operation since the only side effect of discarding the stashing control information is that the relevant updated data may not be stashed in an associated storage structure of the target processing element that may wish to use that updated data, and instead that target processing element will need to obtain the updated data in due course from the memory system when required (just resulting in a longer latency than would have been the case had the data been stashed).

Particular examples will now be described with reference to the figures.

FIG. 1 is a block diagram of a data processing system in which the techniques described herein may be employed. Within the system, a variety of processing elements 10, 20, 30, 40 may be coupled to interconnect circuitry 50, and may be arranged to share access to data stored in main memory 80. The processing elements can take a variety of different forms, for example a central processing unit (CPU) 10, 20, a graphics processing unit (GPU) 30, or other forms of processing element such as an accelerator device 40 used to perform certain operations on behalf of another processing element.

Considering by way of example the processing element 10, that processing element may include decoder circuitry 12 that is arranged to decode a sequence of instructions in order to generate control signals that are then provided to the processing circuitry 14. The processing circuitry is then responsive to those control signals to perform the operations defined by the sequence of instructions. During performance of those operations, the processing circuitry 14 may read source data from registers of a register set 16, and indeed may store result data back to one or more of those registers. Load instructions may be used to load data from the memory system into the registers, whilst store instructions may be used to store data from the registers back to the memory system. In addition to the main memory 80, the memory system may include one or more levels of cache used to cache a subset of the data stored in main memory.

As shown in FIG. 1, the processing element 10 may have a local cache 18 in which to cache a subset of the data. In typical systems a multilevel cache hierarchy may be used, where a number of levels of cache are situated between the processing circuitry 14 of the processing element 10 and main memory 80. One or more levels of cache may be provided locally to a particular processing element, whilst other caches may be shared caches that are accessed by more than one processing element, and are accessed by the processing element 10 issuing access requests to the interconnect circuitry via its interface 19. Hence, the processing element 10 may have one or more levels of local cache (only a single box 18 is shown for simplicity but in some cases more than one local cache may be present), but may also have access to a shared cache such as the system cache 75. As schematically illustrated in FIG. 1, various of the other processing elements may also have local caches, and hence the processing element 20 may have one or more local caches 25, the processing element 30 may have one or more local caches 35, and in some instances the accelerator device 40 may have one or more levels of local cache 45. In one example implementation, each of the processing elements may also have access to the system cache 75.

Whilst for simplicity the details of the processing elements 20, 30, 40 are not shown in FIG. 1 (other than the presence of local caches), in one example implementation one or more of the processing elements may be constructed in an identical manner to that discussed above in respect of the processing element 10.

In a system where multiple processing elements have local caches, a cache coherency protocol will typically be implemented in order to ensure that each processing element has a coherent view of the data. Such a cache coherency protocol may be implemented by coherency management circuitry 65, which can be arranged to have access to cache coherency control storage 70, which may also be referred to herein as snoop filter storage. When one of the processing elements seeks to access an item of data, it may be arranged to output an access request to the interconnect circuitry 50 via its interface 19 specifying the memory address to be accessed, and that access request may be reviewed by the coherency management circuitry 65 in order to determine whether any cache coherency actions need to be implemented when servicing the access request. The snoop filter storage 70 can be used to maintain, for each of a number of memory addresses, an indication of which processing elements 10, 20, 30, 40 are understood to have cached a copy of the data at that memory address in their local caches 18, 25, 35, 45.

Hence, based on a given memory address associated with an access request, the coherency management circuitry 65 may perform a lookup within the snoop filter storage 70 to determine whether any of the other processing elements are understood to have a cached copy of the data for that memory address in their local caches, and in that event can be arranged to issue snoop requests to any such processing elements to cause those processing elements to carry out a coherency action in respect of any cached copy of the data that those processing elements have. Purely by way of example, if the processing element 10 issues a write access request indicating that it wishes to write an updated value for a specified memory address, and the coherency management circuitry 65 determines that processing element 30 currently holds a cached copy of that data, it may send a snoop request to the processing element 30 to cause it to invalidate its copy of the data, and on receipt of the snoop response indicating that the processing element 30 has invalidated the data, the coherency management circuitry 65 may then permit the processing element 10 to store the updated data. At this point, the processing element may store the updated data in its local cache, or in some instances may output the data for storing at a lower level in the memory hierarchy, for example in the system cache 75 or the main memory 80.

There are many situations where there are program threads running on the various processing elements 10, 20, 30, 40, and one program thread executing on one processing element (also referred to herein as the producer processing element) may at some point generate data that is to be consumed by a program thread executing on a different processing element (also referred to herein as the consumer processing element). One way to share that data is to propagate that data to a level of the memory hierarchy from which the consumer processing element can access that data, and hence for example to propagate the data to the system cache 75 or main memory 80 in the example of FIG. 1. However, there can be significant latency associated with performing accesses to the lower levels of the memory hierarchy, along with significant energy consumption associated with such accesses. To reduce latency and energy consumption, and also improve performance, it can be desirable for the updated data produced in such instances by the producer processing element to be provided for stashing in a local cache associated with the consumer processing element. However, it can be difficult for the hardware to detect scenarios where such stashing would be appropriate.

In accordance with the techniques described herein, mechanisms are provided that can provide a great deal of flexibility in the use of stashing, and in particular provide hints to the hardware to facilitate such stashing. More particularly, stashing control circuitry 55 is provided that can be arranged to respond to such hints in order to arrange for updated data generated for a given memory address to be made available for stashing in a local cache associated with a processing element that the hint indicates is a probable consumer processing element for the updated data. During the operation of the stashing control circuitry, the stashing control circuitry may have access to stashing control storage 60 which can be arranged to store stashing control information used by the stashing control circuitry to determine, from amongst the plurality of processing elements 10, 20, 30, 40, one or more of those processing elements that are candidates for stashing of the updated data generated for a given memory address. As will be discussed in more detail later, whilst the stashing control circuitry 55 may be a separate piece of logic distinct from the coherency management circuitry 65, in some instances the stashing control circuitry can be highly integrated with the coherency management circuitry, with stashing indications generated for sending to determined consumer processing elements to facilitate the stashing of updated data being integrated with snoop request signals sent to the processing elements to implement the cache coherency protocol. When adopting such an implementation, it may be the case that the stashing control storage 60 can be integrated within the snoop filter storage 70, as will be discussed in more detail later.

Figure 2:
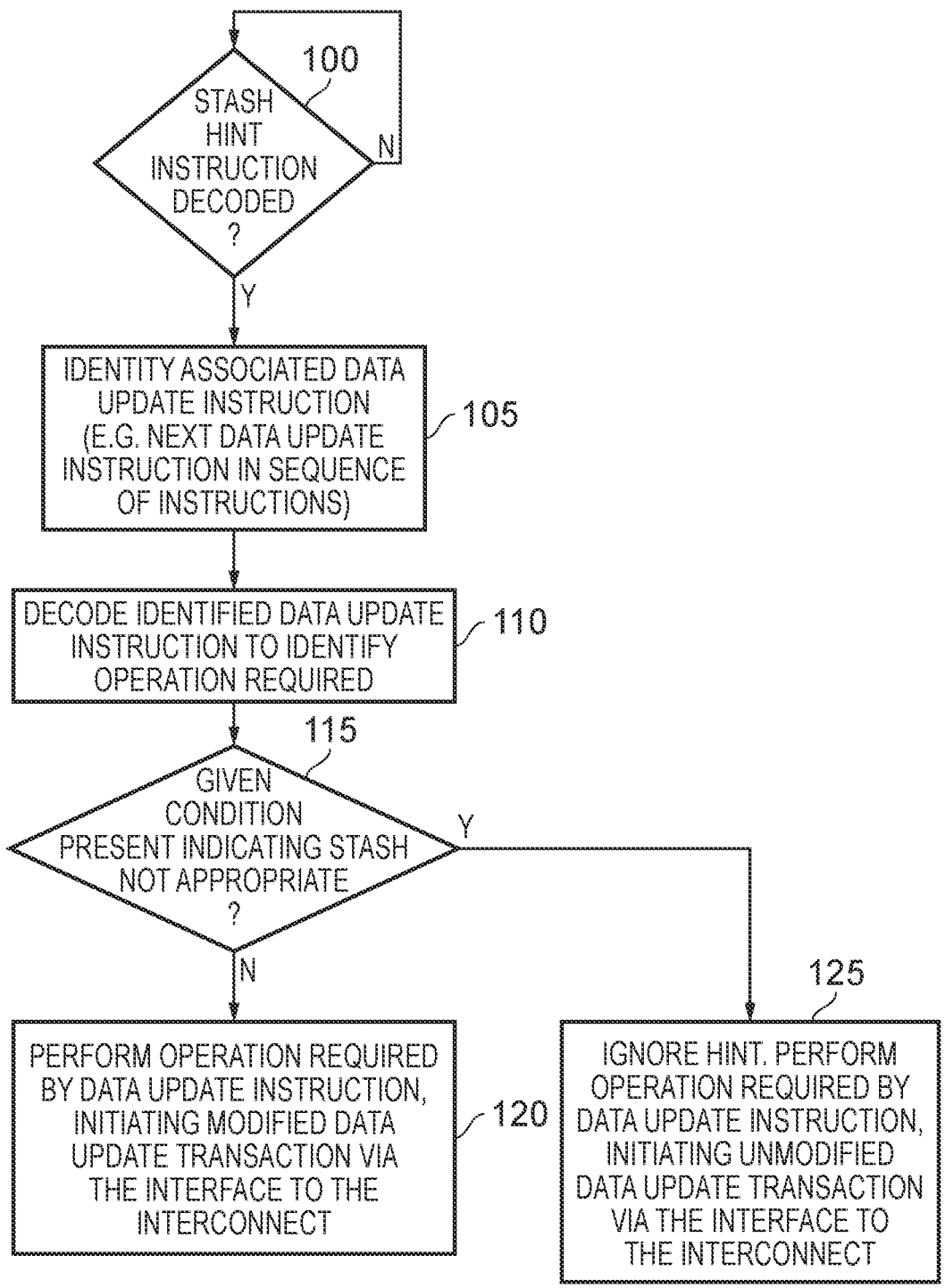
FIG. 2 is a flow diagram illustrating steps that may be performed in response to a stash hint instruction.

FIG. 2 is a flow diagram illustrating steps that may be performed in response to a stash hint instruction. In particular, one of the processing elements 10, 20, 30, 40 may execute a sequence of instructions that includes one or more instances of a stash hint instruction. At step 100, if it is determined that the stash hint instruction has been decoded, then at step 105 an associated data update instruction is identified for the stash hint instruction. There are a number of ways in which the associated data update instruction may be identified, but in one example implementation it may be the next instruction of a particular type within the instruction sequence, and in one particular example implementation the stash hint instruction will be included within the sequence directly before the relevant data update instruction.

Once the associated data update instruction has been identified, that instruction will be decoded at step 110 in order to identify the update operation required. At step 115, it may be determined whether a given condition is present indicating that stashing of the updated data that will be generated as a result of the data update instruction is not appropriate. Purely by way of example, if from the cache state or history the processing element performing the process of FIG. 2 determines that a stashing of the updated data is unlikely to be useful, that processing element could ignore the stash hint instruction and merely cause an unmodified data update transaction to be initiated, as indicated by step 125. This could for example be useful in situations where a program is running in single threaded mode, if two or more threads that would share the data are running on the same processing element, or if it is determined that a thread may update a location or a cache line multiple times consecutively. As indicated by step 125, at this point an appropriate request signal may be issued via the interface 19 to the interconnect circuitry 50 to initiate the unmodified data update transaction in order to perform the operation required by the data update instruction.

However, if that given condition is determined not to be present, the process may be arranged to proceed to step 120 where the operation required by the data update instruction is performed, but by causing a modified data update transaction to be initiated via the interface 19 to the interconnect circuitry 50. The handling of such a modified data update transaction will be discussed in detail below with reference to FIG. 3.

Whilst in the example of FIG. 2, an assessment as to the presence or not of the given condition is performed at step 115, in an alternative example implementation it may be arranged that modified data update transaction is always performed in the presence of the stash hint instruction, and accordingly step 115, and the associated branch to step 125, may be omitted, with the process proceeding directly from step 110 to step 120.

Figure 3:
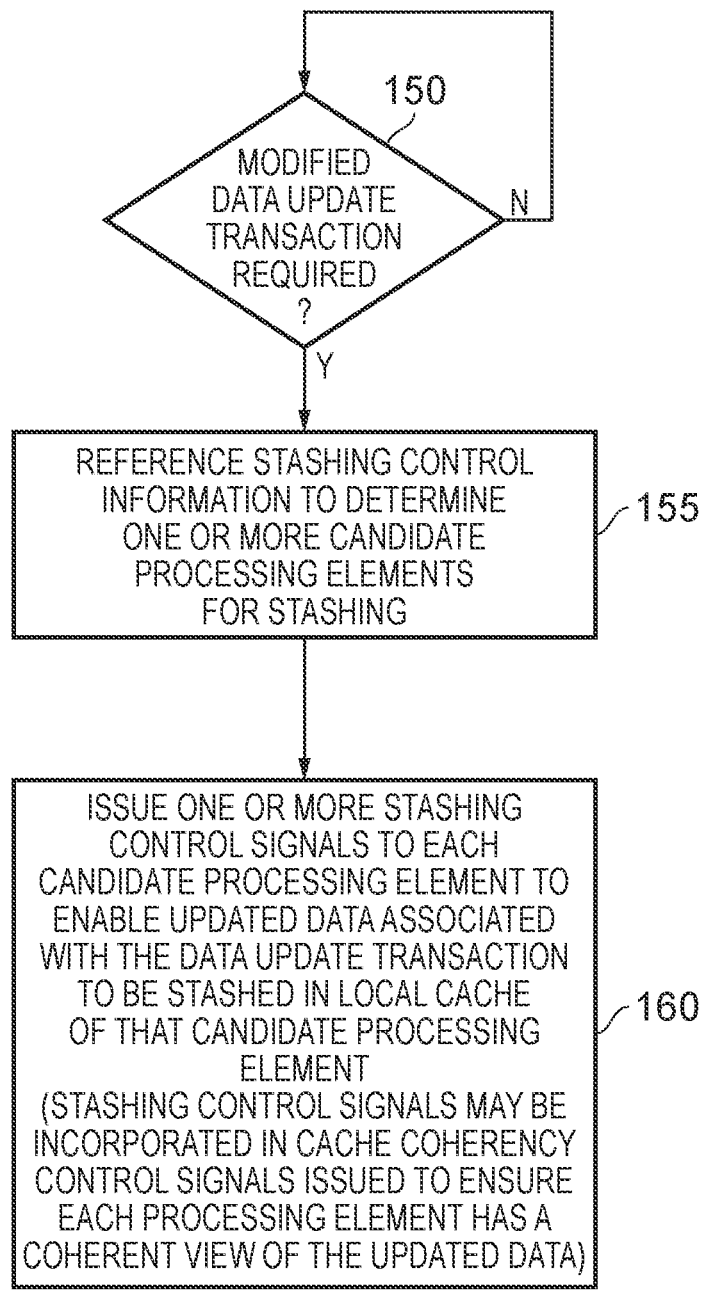
FIG. 3 is a flow diagram illustrating steps that may be performed upon detection of a modified data update transaction.

FIG. 3 is a flow diagram illustrating steps taken by the stashing control circuitry upon receipt of a request indicating that a modified data update transaction is to be performed. When the need for such a modified data update transaction is determined at step 150, then at step 155 the stashing control circuitry 55 references stashing control information in order to determine one or more candidate processing elements for stashing. There are a variety of ways in which the stashing control information may be made available to the stashing control circuitry, some examples of which will be discussed later with reference to FIGS. 4A to 4C.

Assuming at least one candidate processing element for stashing is determined from the stashing control information, then the process proceeds to step 160 where one or more stashing control signals are issued to each candidate processing element to enable updated data associated with the data update transaction to be stashed in the local cache of that candidate processing element. As will be discussed in more detail later, in one example implementation such stashing control signals may be incorporated in cache coherency control signals issued to ensure that each processing element has a coherent view of the updated data.

FIG. 4A illustrates one mechanism that may be used for providing the stashing control information to the stashing control circuitry. In the example of FIG. 4A, the stashing control information is incorporated directly within the stash hint instruction. Hence, an opcode field 172 of the stash hint instruction 170 may identify that the instruction is a stash hint instruction, whilst the field 174 may be used to provide stashing control information. This could for example take the form of an identifier for the consumer processing element that is understood to require the updated data. If desired, field 174 could be used to specify the identifier for more than one consumer processing element if it is understood that multiple consumer processing elements may require the updated data. When adopting the implementation of FIG. 4A, the consumer identifier information specified by the stash hint instruction can be incorporated within the modified data update transaction issued from the interface of the processing element that has executed the stash hint instruction, with the stashing control circuitry 55 then referencing that information during step 155 of FIG. 3.

FIG. 4B illustrates an alternative example of how the stashing control information may be provided. In this example, the information maintained in the snoop filter storage 70 is used directly as the stashing control information. FIG. 4B illustrates an example of snoop filter storage 180, the snoop filter storage 180 including a number of entries 182. Each entry can be populated to identify an address indication for a memory address, and for each of the various processing elements that may be able to cache a copy of that data, the entry includes a field to identify whether that processing element is understood to have cached a copy of the data or not. For the example shown in FIG. 4B, in particular looking at the first entry 182 of the snoop filter storage 180, the information indicates that processing element 0 and processing element 2 may have cached a copy of the data. If, by way of illustration, processing element 0 is the producer processing element that has executed the stash hint instruction and is performing the data update operation, then the information in the snoop filter storage can be used by the stashing control circuitry at step 155 to determine that processing element 2 is a candidate processing element for stashing, and as a result one or more stashing control signals can be issued to the processing element 2 at step 160 of FIG. 3 to enable the updated data to be made available for stashing in the local cache of processing element 2.

FIG. 4C illustrates another example implementation, where the stashing control information is maintained within a stashing control storage, and in this example the stashing control information is based on indications made by consumer processing elements of their interest in having certain data stashed in their local cache. Hence, the stashing control storage 190 may include a plurality of entries 192, and in a similar way to that discussed earlier for the snoop filter storage each entry may have an address indication allocated therein identifying a particular memory address. In addition, fields are provided within each entry to enable an indication to be kept of any processing elements that have registered an interest in having updated data for the allocated memory address stashed in their local cache, such an interest also being referred to herein as an intent to read the updated data. Hence, by way of example, considering the top entry 192 within the stashing control storage 190, it is indicated that processing element 2 has registered an intent to read updated data associated with the memory address allocated to that entry, and accordingly if a modified data update transaction is initiated in respect of that memory address, then the stashing control circuitry can determine at step 155, with reference to the stashing control storage 190, that processing element 2 is a candidate processing element for stashing, and accordingly at step 160 can issue one or more stashing control signals to processing element 2 to enable the updated data to be made available for stashing in the local cache of processing element 2.

Whilst the stashing control storage 190 could be an entirely separate storage used solely for maintaining stashing control information, in another example implementation the stashing control storage could be implemented by appropriate modification to an existing storage structure. For example, the snoop filter storage 180 could be adapted to include additional information representing stashing control information. Hence, an entry allocated in the snoop filter storage for a given memory address may then identify not only which processing elements are understood to have cached a copy of that data, but also identify any processing elements that have registered an intent to read that data.

There are a variety of ways in which a processing element may be identified as having an interest in reading data for a specified memory address, with that identified interest being used as a hint by the stashing control circuitry that it may be appropriate to seek to stash updated data for that specified memory address in the local cache of the processing element that has been identified as having an interest in the updated data. For example, prediction circuitry may be provided within the system to seek to make predictions as to processing elements that may be interested in the data for certain memory addresses, for example based on past behaviour. However, in one example the registering of an interest in certain data is achieved by a consumer processing element executing a stashee hint instruction. Such an approach will be discussed further with reference to FIG. 5.

Figure 5:
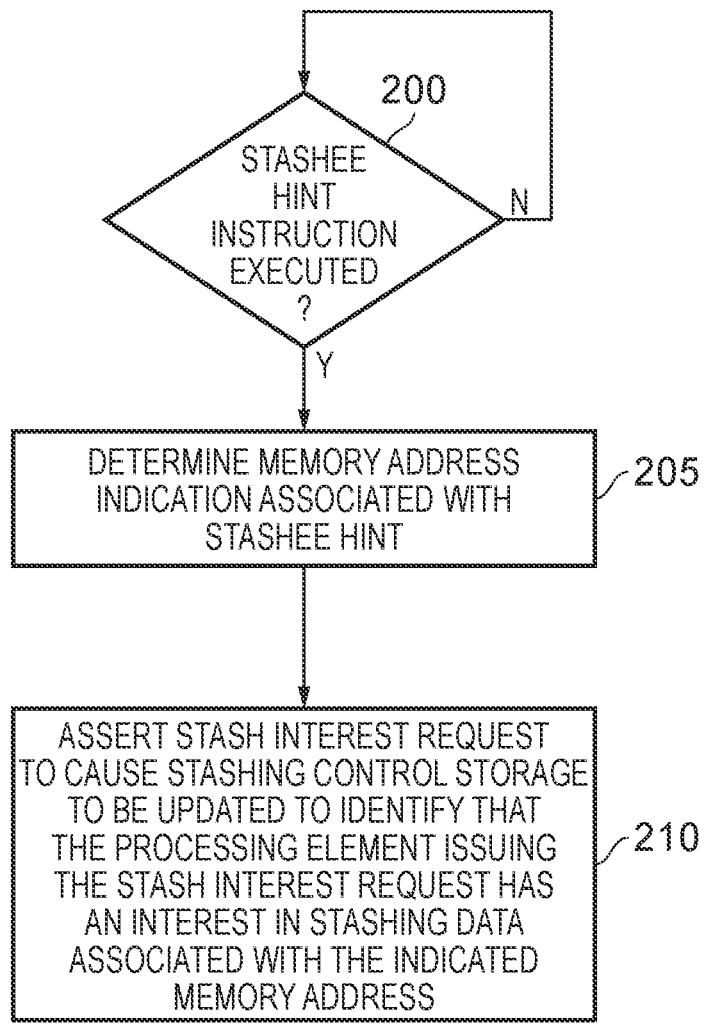
FIG. 5 is a flow diagram illustrating steps that may be performed upon detection of a stashee hint instruction.

As shown in FIG. 5, when a consumer processing element executes a stashee hint instruction at step 200, then at step 205 a memory address indication associated with the stashee hint is determined. This may for example be provided directly by the stashee hint instruction, or the stashee hint instruction may include sufficient information to enable the memory address indication to be determined. Then, at step 210, the consumer processing element is arranged to assert a stash interest request, to cause stashing control storage 60 to be updated to identify that that consumer processing element has an interest in stashing data associated with the indicated memory address. As will be apparent from the earlier discussions, the stashing control circuitry 55 can then reference that stashing control information in due course when updated data for the indicated memory address is being generated, and then issue one or more stashing control signals to the consumer processing element to allow the updated data to be stashed in that consumer processing element's local cache.

FIGS. 6 to 10 are diagrams contrasting the interactions that may occur between components of a system when adopting techniques described herein, and the interactions between those components that may occur without using the techniques described herein. Starting first with FIG. 6, the left-hand side of the figure shows a sequence of interactions 270 between a processing element 250 that wishes to generate updated data (referred to herein as the producer processing element), coherency management circuitry 255 within the interconnect (which can be considered to correspond to the coherency management circuitry 65 shown in FIG. 1, but which may also be referred to herein as a home node (HNF)) and a processing element 260 that may wish to use the updated data (referred to herein as the consumer processing element). This sequence 270 assumes that the hint instructions described herein are not used, and hence is provided for illustration purposes to indicate a series of interactions that may be required when not adopting the techniques described herein. At the start of the sequence 270, it is assumed that the producer processing element 250 is caching a copy of the current data for a given memory address in the shared clean (SC) state and that the consumer processing element is also caching a copy of that data in the SC state. In order for the producer processing element to update the data, then in accordance with the cache coherency protocol employed by the coherency management circuitry 255, the producer processing element needs to obtain a copy of the data in unique state (meaning that no other processing element has a valid cached copy of the data).

To achieve this, as shown by the sequence of interactions 270, the producer processing element 250 may initiate a data update transaction by issuing a "MakeReadUnique" request signal to the home node 255. The home node responds to this request by determining from the snoop filter storage that the consumer processing element 260 currently holds a copy of the data, and accordingly issues a snoop request signal (the "SnpCleanInvalid" signal shown in FIG. 6) to the consumer processing element 260 that causes that processing element to invalidate its copy of the data (as indicated by the "I" state in FIG. 6). Once the data has been invalidated, the consumer processing element 260 issues a snoop response indicating that the data has been invalidated (the "SnpRsp_I" signal shown in FIG. 6). However, because the consumer processing element still has an interest in the data, it may additionally subsequently issue a read request to the home node 255 to seek to obtain the updated data (that read request being indicated by the "ReadShared" signal in FIG. 6).

Once the home node 255 has received the snoop response confirming that the consumer processing element 260 has invalidated its copy of the data (if the snoop filter indicated that more than one consumer processing element had a copy of the data, it would have issued snoop request signals to each of those processing elements, and would at this point wait until it had received the snoop responses from all of the processing elements snooped), the home node will issue a completion signal to the producer processing element confirming that the producer processing element now has the data in the unique clean (UC) state (as indicated by the "Comp_UC" signal FIG. 6), and at this point the producer can store the updated data value in its local cache, changing the state of that data to the unique dirty (UD) state (the dirty designation indicating that the data is more up-to-date than the copy held in memory, and accordingly will need to be propagated to a lower level of the memory hierarchy in due course, for example when the data is evicted from the producer processing element's local cache). At this point, the producer processing element 250 will issue an acknowledgement signal to the home node 255 (the "CompAck" signal shown in FIG. 6).

Given that the home node 255 has received a read request from the consumer processing element 260, it will then issue a snoop request signal to the producer processing element 250 to cause a copy of that data to be provided to the consumer processing element 260. In the example illustrated in FIG. 6, this snoop request signal is referred to as a "SnpSharedFwd" signal and will identify that the producer processing element 250 should provide a copy of the updated data to the consumer processing element 260, that updated data then being provided via the "CompData_SC" signal shown in FIG. 6 (in the example of FIG. 6 it is assumed that the implementation allows the producer processing element to pass the data directly to the consumer processing element through the interconnect fabric). At this point, the producer processing element will change the state of its copy of the data to the shared clean state, as will the consumer processing element 260 when it stores a copy of that data in its local cache. It should be noted that in this example the dirtiness of the data can be tracked by the home node 255, hence why the producer processing element can update the state of its copy to the shared clean state. In an alternative implementation that supports "shared dirty" state, the dirtiness of the data could be tracked by one of the processing elements. Thereafter, as shown in FIG. 6, the consumer processing element 260 can send an acknowledgement back to the home node 255 to confirm that it has received the updated data from the producer processing element 250.

Figure 6:
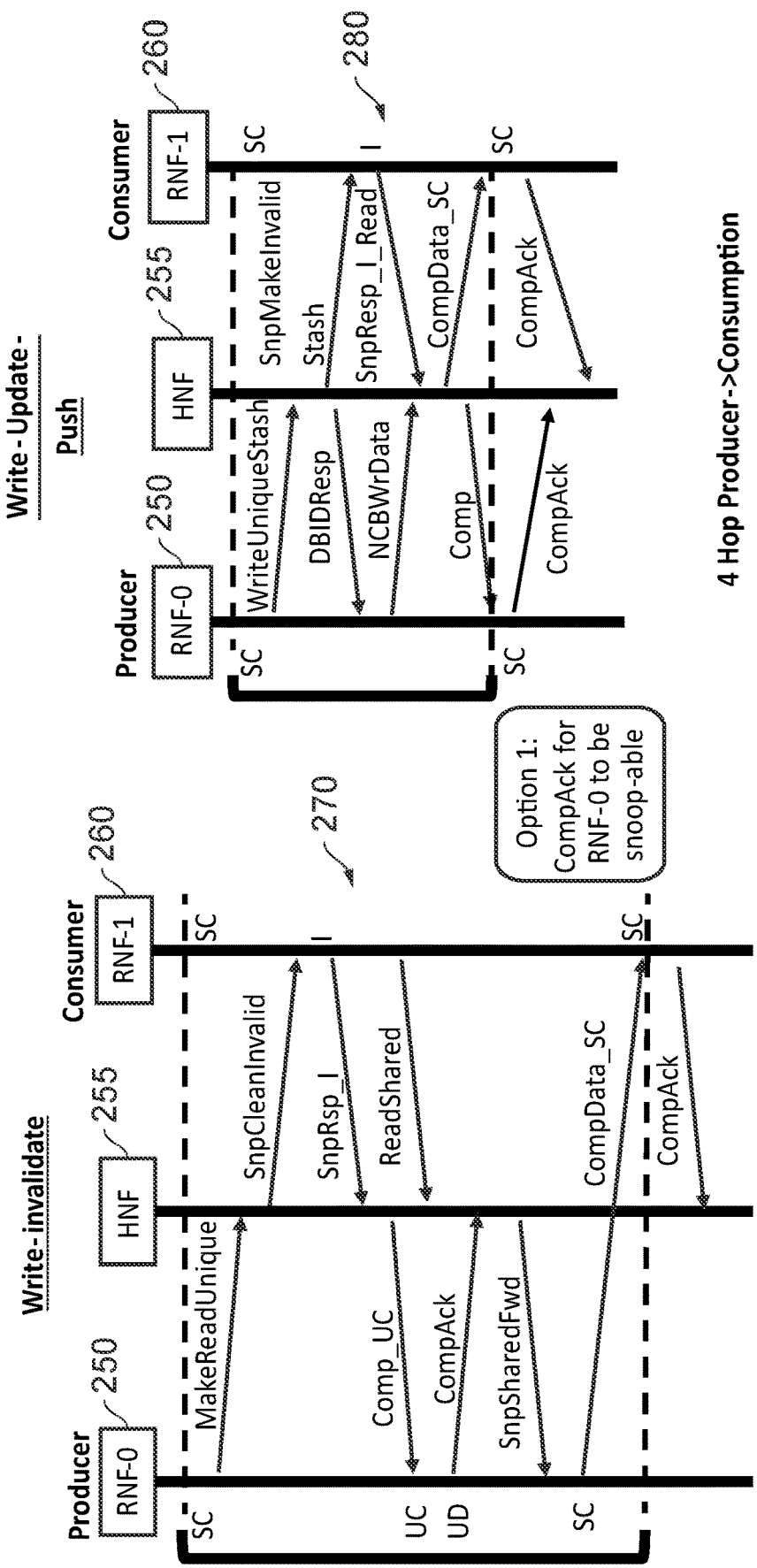
FIGS. 6 to 10 are diagrams contrasting the interactions that may occur between components of a system when adopting techniques described herein, and the interactions between those components that may occur without using the techniques described herein.

The data update transaction initiating the sequence of interactions 270 shown in FIG. 6 may be referred to as a write-invalidate transaction, since an invalidation of any other cached copies of the data is performed before the producer processing element can store updated data in its local cache. As can be seen, the sequence of interactions 270 involves seven hops between the indicated components before the updated data is stored both within the cache of the producer processing element and the cache of the consumer processing element.

The right-hand side of FIG. 6 shows a sequence of interactions 280 that can achieve the same end result, but using techniques described herein. In particular, it is assumed that the producer processing element 250 has executed the earlier mentioned stash hint instruction which has then been associated with the data update instruction, and as a result a modified data update transaction is initiated (which may be referred to herein as a write-update-push transaction). As with the left hand side of FIG. 6, the process starts with both the producer processing element 250 and the consumer processing element 260 caching a copy of the data in the SC state. On determining that a modified data update transaction should be initiated, the producer processing element issues a request signal to the home node 255 (referred to in FIG. 6 as a "WriteUniqueStash" request signal).

As before, the home node 255 is responsive to the request signal to reference the snoop filter storage, and again determines that the consumer processing element 260 holds a copy of the data. However, due to the different form of request it has now received, it issues a snoop request signal of a slightly different form to the consumer processing element 260, referred to in FIG. 6 as a "SnpMakeInvalidStash" snoop request signal. This causes the consumer processing element 260 to invalidate its local copy of the data, and also gives the consumer processing element the opportunity to stash the updated data. Once the data has been invalidated, the consumer processing element 260 issues a snoop response indicating that the data has been invalidated and, assuming it wishes to also stash a copy of the updated data, flags in that snoop response that it wishes to receive the updated data (in FIG. 6 this is indicated by the "read" suffix in the "SnpResp_I_Read" response signal).

Meanwhile, the home node 255 may also have responded to the request signal from the producer element 250 by issuing a response to the producer element (indicated in FIG. 6 as the "DBIDResp" signal) asking it to provide a copy of the updated data, and this causes the producer 250 to return a copy of the updated data (indicated in FIG. 6 by the "NCBWrData" signal).

Hence, on receiving the snoop response with an indication that the consumer element 260 wishes to stash the data, the home node 255 can provide a completion signal to the consumer processing element 260 that includes the updated data (indicated in FIG. 6 by the "CompData_SC" signal), this causing the consumer processing element 260 to store the updated data in its cache in the shared clean state. In addition, the home node 255 can issue a completion signal to the producer processing element 250 indicating that the producer processing element can store the updated data in the shared clean state in its local cache. Both the producer processing element 250 and the consumer processing element 260 can then issue acknowledgement signals back to the home node 255 to confirm that the updated data has been stored in their local caches. In the example implementation shown In FIG. 6, the home node 255 uses the acknowledgement signals to determine when it is able to send any subsequent snoop requests to the associated processing elements in respect of the memory location that has been the subject of the write-update-push transaction. Hence, for example, the home node 255 will determine when it receives the acknowledgement signal from the producer element 250 (the CompAck signal shown in FIG. 6) that the producer processing element 250 is now available to receive a subsequent snoop request as and when required.

As will be apparent from a comparison of the sequence of interactions 280 with the sequence of interactions 270, when using the techniques described herein the number of hops can be significantly reduced. In particular, the sequence of interactions 280 involves only four hops between the indicated components before the updated data is stored both within the cache of the producer processing element and the cache of the consumer processing element (compared with the seven hops that was required when using the sequence of interactions 270).

It should be noted that the hops being referred to above are logical hops, and the actual number of physical hops within the interconnect circuitry may be dependent on the topology used for the interconnect. For example, assuming a coherent mesh network (CMN) is used, each logical hop may involve multiple CMN link hops between the nodes of the mesh network.

Figure 7:
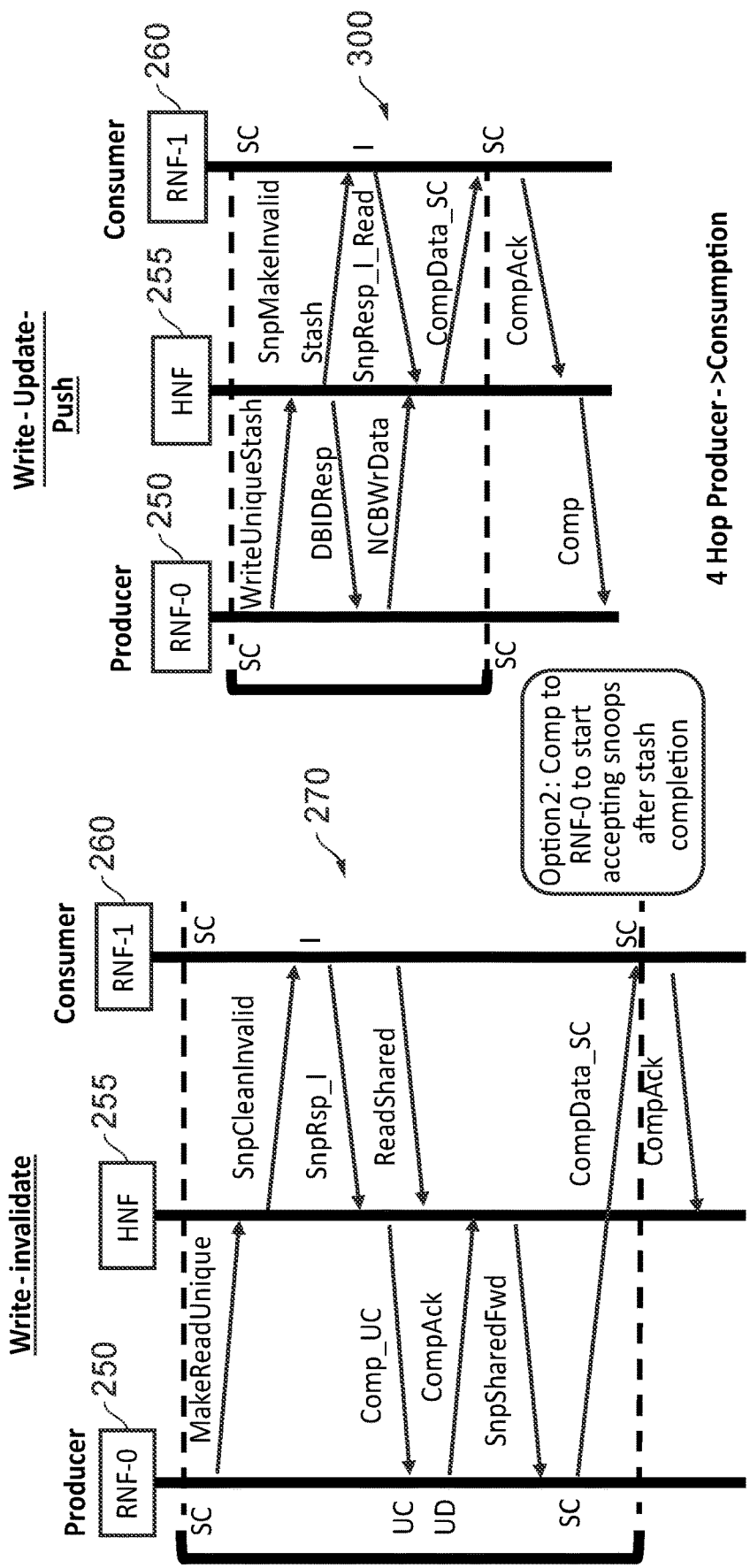

FIG. 7 illustrates a slightly modified sequence of interactions 300 that may be used to perform the write-update-push transaction in accordance with one example implementation. The left hand sequence 270 is exactly the same in FIG. 7 as in FIG. 6, but the right hand sequence 300 in FIG. 7 differs from the right hand sequence 280 in FIG. 6 in that the completion signal is not issued from the home node 255 to the producer processing element 250 until the acknowledgement signal (the CompAck signal) has been received by the home node 255 from the consumer processing element 260. The provision of the completion signal to the producer processing element 250 then indicates that the producer processing element can begin processing subsequent snoop requests in respect of the memory location that has been the subject of the write-update-push transaction.

Figure 8:
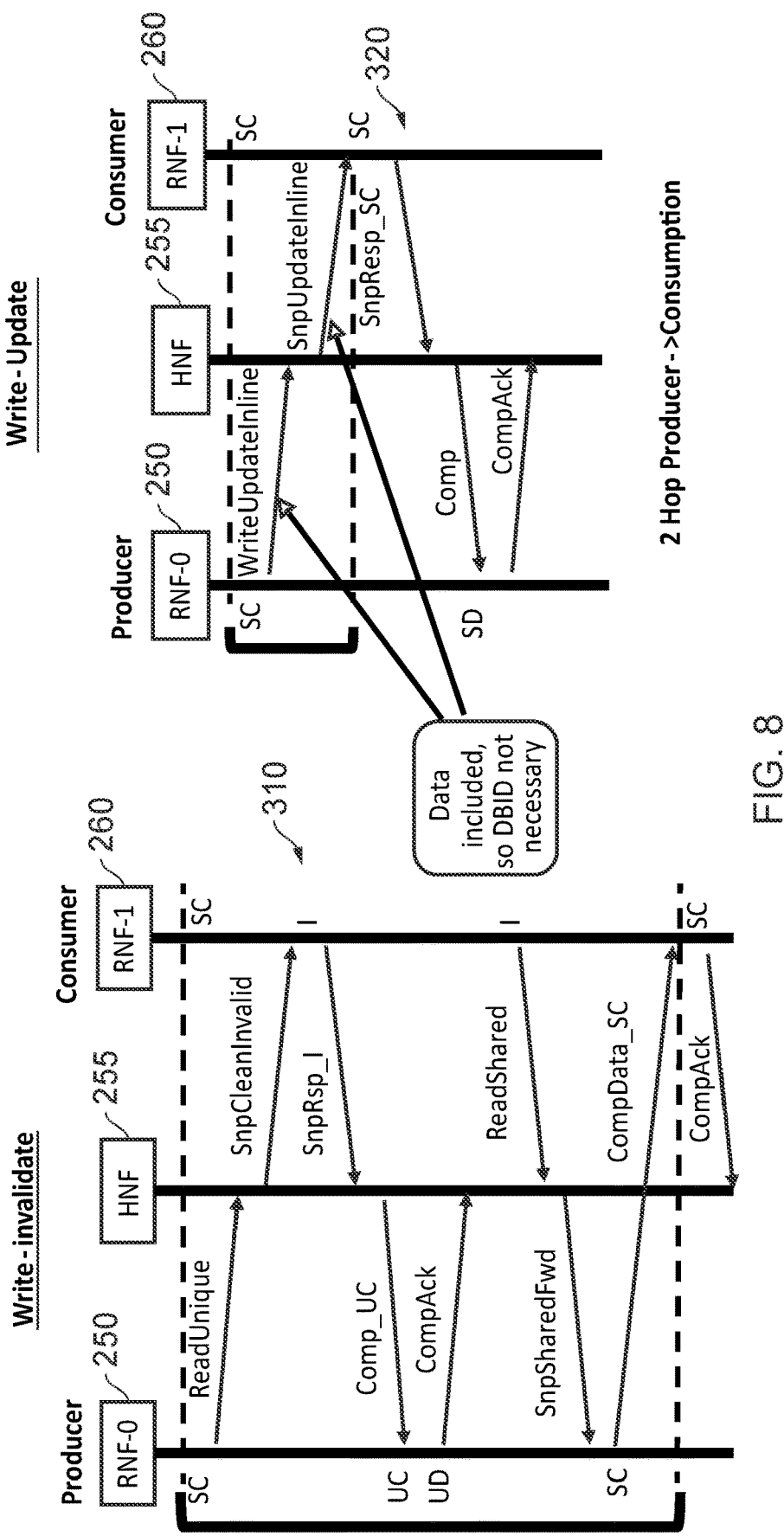

FIG. 8 schematically illustrates an alternative form of modified data update transaction that may be implemented in one example. Again a write-invalidate sequence (not using the techniques described herein) is shown on the left hand side of the figure for comparison, the sequence of interactions 310 differing from the sequence of interactions 270 shown in FIGS. 6 and 7 merely in the timing of the "ReadShared" signal issued by the consumer processing element 260. In particular, the timing of that request to read the data is not significant, and can come after the CompAck signal received from the producer processing element to confirm that the updated data has been stored in the producer processing element's local cache in the UD state (as shown in FIG. 8) or before receipt of that CompAck signal (as shown in FIGS. 6 and 7).

In the example shown in the right hand side of FIG. 8, it is assumed that the modified data update transaction seeks to perform an inline update of the data within the local cache of consumer processing element 260. In particular, in response to execution of the earlier mentioned stash hint instruction in association with the subsequent data update instruction, the producer processing element 250 initiates the modified data update transaction by issuing a WriteUpdateInline request to the home node 255. In this example, it is assumed that that request includes the updated data, and hence there is no need for the DBID response used in the sequences 280, 300 discussed earlier. Again, the home node 255 determines that the consumer processing element 260 has a cached copy of the data, and issues a snoop request signal to the consumer processing element 260 which also provides the updated data and indicates that an inline update of the data in the consumer processing element's cache should take place, thereby causing the updated data to be stashed within the consumer processing element's cache.

Accordingly, the consumer processing element 260 responds to this snoop request signal by updating its local copy of the data to reflect the updated data provided in this snoop request, and then issues a snoop response confirming that the updated data has been stored in the shared clean state. Once the home node 255 receives that snoop response, it then issues a completion signal to the producer processing element 250, which in this case causes the producer processing element 250 to store the updated data in its local cache in the shared dirty (SD) state, whereafter an acknowledgement signal is issued back to the home node 255. By appending the updated data to the original request issued by the producer element 250, such an approach can further reduce the round-trip latency.

In the example shown in FIG. 8, it is assumed that the producer processing element 250 supports storing of the updated data in the shared dirty state. If that is not the case, then as with the earlier examples the producer processing element may store the updated data in the shared clean state, and the home node can be arranged to obtain a copy of the updated data (typically the entire cache line containing the updated data) using a DBID or SnpResp signal, and can track the dirtiness of that data within its local storage structures (for example the earlier mentioned snoop filter storage) to enable the updated data to be written back to memory later (or indeed during the processing of the write update transaction).

Figure 9:
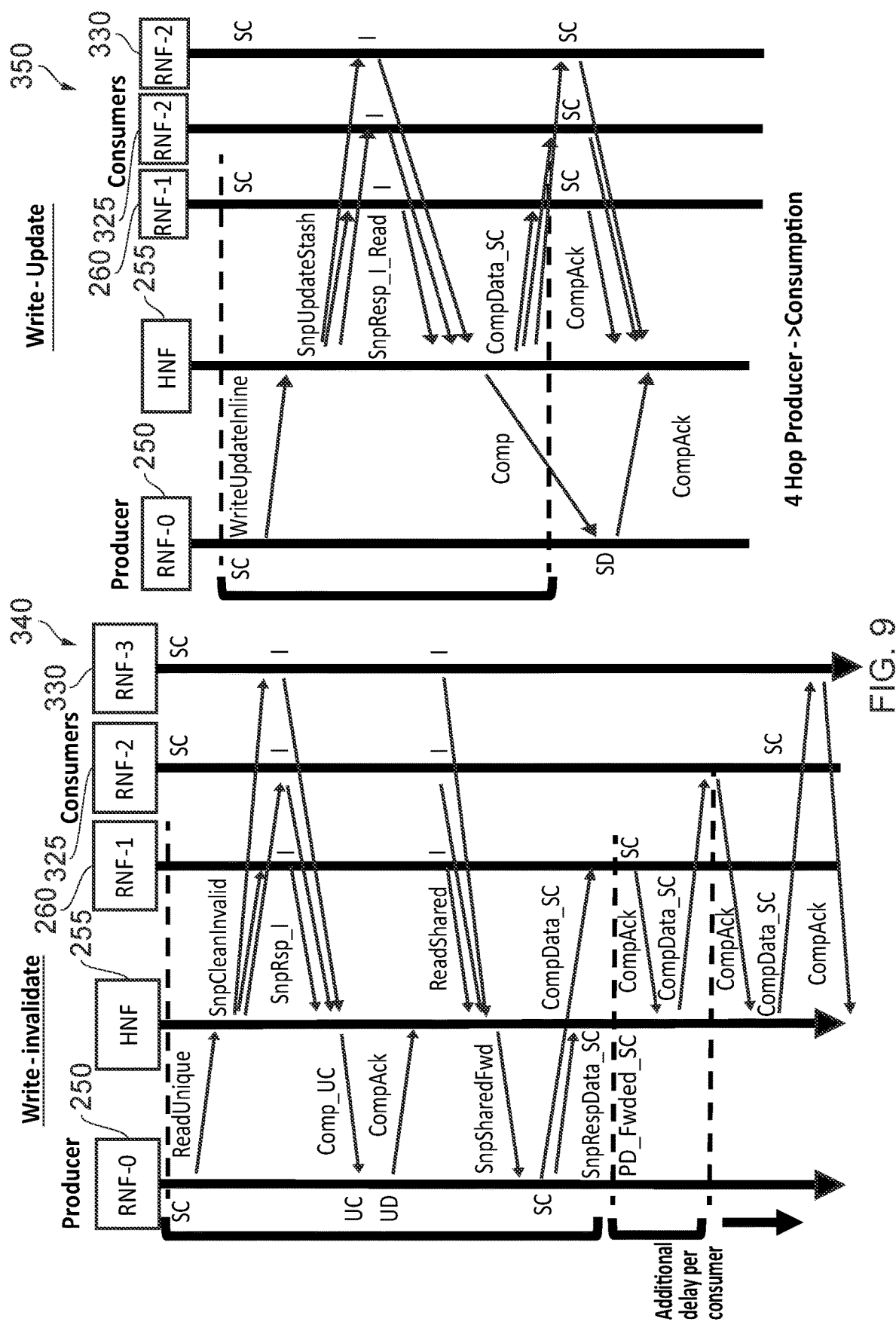

FIG. 9 shows a variant of the FIG. 8 approach, in situations where the home node determines that there are multiple consumer processing elements that have cached copies of the data in question. The sequence 340 on the left-hand side of FIG. 9 shows the write-invalidate process that would be performed, i.e. in the absence of the techniques described herein. As is shown, snoop requests will be issued to each of the consumer processing elements 260, 325, 330, and separate invalidate responses will be received, along with separate requests to re-read the data. The updated data will then be provided (in the example shown this is done sequentially) to each of the consumer processing elements 260, 325, 330. When the producer processing element 250 provides the updated data to the first consumer processing element 260, it will also send a snoop response with the updated data to the home node 255, so that the home node 255 can subsequently handle the forwarding of the updated data to the other consumer processing elements 325, 330 in due course. This snoop response is labelled "SnpRespData_SC_PD_Fwded_SC" to indicate that the producer RNF_0 has the data in the shared clean (SC) state, and that it has passed dirty (PD) to the home node, whilst also informing the home node that the data was forwarded directly to the consumer RNF-1 in the SC state.

When using the techniques described herein, the number of hops can be significantly reduced using the inline update approach, since the home node 255 is provided with the updated data as part of the original request issued by the producer processing element 250. However, as shown by the sequence 350 on the right-hand side of FIG. 9, in order to ensure coherency of the data is maintained, an inline update cannot be performed within each of the consumers, and instead each of the consumers receives a snoop request (the SnpUpdateStash" request shown in FIG. 9) requiring it to invalidate its local copy of the data, but identifying that the updated data will be available for stashing. Assuming each of the snoop responses from the consumer processing elements 260, 325, 330 indicates not only that the data has been invalidated in the local caches, but also indicates that stashing of the updated data is desired (as discussed earlier with reference to FIG. 6, this is indicated by the "read" suffix in the snoop response), then the home node 255 can provide the updated data to each of the consumer processing elements 260, 325, 330 (as indicated by the "CompData_SC" signals within the sequence 350 of FIG. 9). This will cause each of the consumer processing elements 260, 325, 330 to store the updated data in their local caches in the shared clean state, and to issue acknowledgements back to the home node 255 when that has been done. In addition, the home node 255 will also issue a completion signal to the producer processing element 250 to enable the producer processing element to store the updated data in its local cache in the shared dirty state, with the producer processing element 250 then issuing an acknowledgement signal in the same way as discussed earlier with reference to FIG. 8.

As noted above, if there are multiple consumer processing elements that have cached copies of the data, then as shown in FIG. 9 those copies need to be invalidated first in order to satisfy memory consistency, and as will be apparent from a comparison of the sequence 350 of FIG. 9 with the sequence 320 of FIG. 8, this adds two more hops than would be required if there is only a single consumer processing element caching a copy of the data and hence the inline update process of FIG. 8 could be performed.

Figure 10:
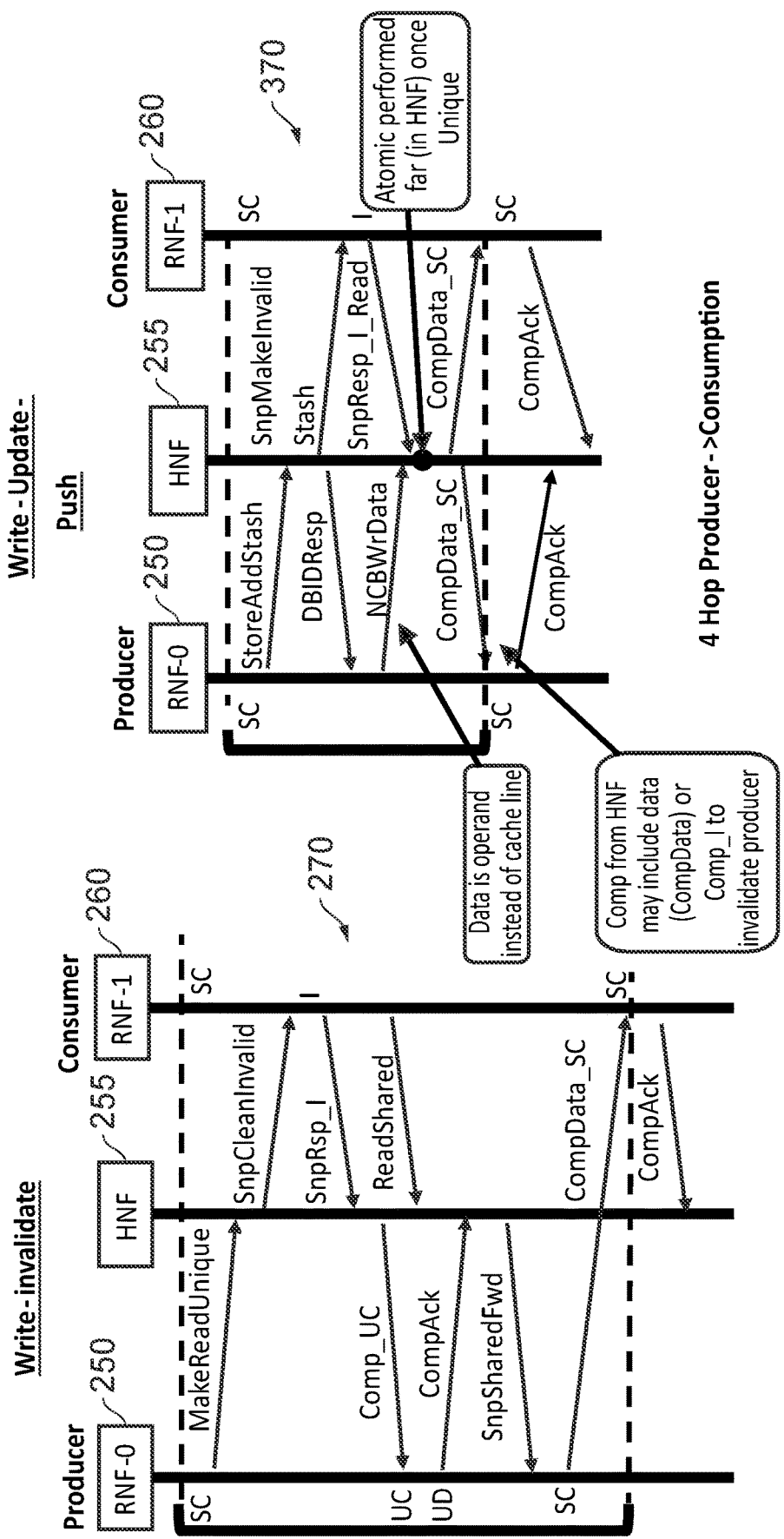

Whilst in the earlier examples it is assumed that it is the producer processing element 250 that is generating the updated data, this is not a requirement, and instead the modified data update transaction initiated by the producer processing element 250 may specify an atomic update operation requiring the home node 255 to generate the updated data from one or more source operands provided for the modified data update transaction. Such an approach is shown in FIG. 10. For comparison, the earlier described write-invalidate sequence 270 is shown on the left-hand side of FIG. 10.

As shown by the sequence 370 on the right-hand side of FIG. 10, when it is determined that an atomic operation is required, the producer processing element 250 may initiate the required modified data update transaction by issuing a particular form of request referred to in FIG. 10 is a "StoreAddStash" request. This indicates that the home node is required to perform an addition operation to generate the updated data to then be stored, and should also make the updated data available for stashing. In the same way as discussed previously, the home node 255 will then determine that the consumer processing element 260 has a copy of the data, and will issue a snoop request signal of the same form as discussed earlier with reference to FIG. 6, to cause the consumer processing element to invalidate its local copy, but if desired to indicate that it wishes to stash the updated data. In the same way as discussed earlier with reference to the sequence 280 of FIG. 6, the consumer processing element 260 will issue a snoop response when it has invalidated the data, and may add the "read" suffix to indicate that it wishes to stash the updated data.

In addition, the home node 255 may issue a "DBIDResp" signal to the producer processing element 250, but in contrast to the sequence 280 FIG. 6, since an atomic operation is being performed here, the data that the producer processing element 250 provides in the subsequent "NCBWrData" signal is the operand data to be used to generate the updated data rather than the updated data for the cache line in question.

Once the home node 255 has received that source operand data, and also has received the snoop response from the consumer processing element 260 confirming that the consumer's copy of the data has been invalidated, it can then perform the atomic operation (which may be referred to as a "far" atomic operation because the operation is performed at a remote location from the producer processing element, in particular at the home node) in order to generate the updated data. Once the updated data has been generated, both the original and updated data can then be provided back to the producer processing element 250 (via the CompData_SC signal) to cause the producer processing element 250 to store the updated data in the shared clean state in its local cache, and can also be provided to the consumer processing element 260 (via the CompData_SC" signal) to cause the consumer processing element to stash the updated data in its local cache in the shared clean state. As discussed earlier with reference to FIG. 6, both the producer processing element 250 and the consumer processing element 260 may then issue acknowledgement signals back to the home node 255 to confirm that their locally cached copies have been updated.

As noted in FIG. 10, whilst the CompData_SC signal issued from the home node 255 to the producer processing element 250 may include the updated data, it could alternatively take the form of a completion invalidate signal used to invalidate the producer processing element's cached copy of the data (if for example it is determined that the producer processing element does not need a cached copy of the updated data). In that event, the provision of the data to the consumer processing element 260 may cause the consumer processing element to store the updated data in its local cache in a unique state (in one example this could be the unique dirty state so that the home node does not need to cache the data).

In the example of FIG. 10, it is assumed that the atomic operation required is an STADD operation, and hence a StoreAddStash request is issued, but it will be appreciated that the same technique could be applied for a variety of atomic operations that can be executed in a far manner (i.e. with the resultant updated data being generated by the home node).

The data that may be stashed using the techniques described herein can take a wide variety of different forms, and merely by way of example could take the form of synchronisation variables, locks, data used in message queues, inter-core work queues, etc. There are many situations where such data needs to be shared between threads. For example, synchronisation and communication operations using such data appear frequently in many parallel computing applications.

As discussed earlier with reference to FIG. 5, in accordance with the techniques described herein a stashee hint instruction may be provided that can be included in code executed by a consumer processing element that has an interest in reading data at a given memory address. This can be used to register with the stashing control circuitry 55 an interest in having updated data for that given memory address stashed in the consumer processing element's local cache. Whilst this stashee hint instruction may be used in implementations that also support the earlier discussed stash hint instruction executed on a producer processing element, it should be noted that the use of the stashee hint instruction is not restricted to such situations, and in some implementations the stashee hint instruction may be used within a system where producer processing elements are not using stash hint instructions.

As an example of a scenario where use of the stashee hint instruction can provide performance benefits, a common software sequence is to pass messages from one thread to another thread using a payload/flag model. The general form of the code sequence for message passing is as follows, where P0 is the producer processing element and P1 is the consumer processing element:

P0:
    (1) STR <payload>
    (2) STLR <flag>
P1:
    (1) SEVL
    (2) WFE
    (3) LDAXR <flag>
    (4) CMP <flag>, <expected value>; test to see if flag has been updated
    (5) B.NE <2>; branch back to WFE (and wait) if flag not updated
    (6) LDR <payload>

Considering first the code (thread) executed by processor P0, the STLR instruction is a store release instruction and implements an ordering requirement to make sure that the storing of the flag is not visible until after the payload is visible. Considering the code (thread) executed by the processor P1, the "send event local" (SEVL) instruction sets a status bit in processor P1 to indicate that there has been an event, this ensuring that when the WFE (wait for event) instruction is then executed it will be determined that there is an event. In the absence of an event, execution of the WFE instruction will cause the processor P1 to go to sleep until an event is detected. However, by using the SEVL instruction, this ensures that this does not happen on the first execution of the WFE instruction, and instead ensures that processing continues during the first iteration of the code sequence in order to test the state of the flag. In particular, the LDAXR (load acquire exclusive instruction) instruction is executed, this being an ordered load instruction that ensures that that load is done before any subsequent load, with the exclusive feature of the instruction tagging an exclusive monitor to ensure that processor P1 is informed if any other processing element writes to the flag before processor P1 does so. Such an indication from the exclusive monitor can in due course be used to wake the processor P1 up from the wait for event, as will be discussed later.

As shown in the code, once the flag has been loaded, a compare instruction is executed to compare the value of the flag with an expected value, thus testing to see if the flag has been updated by the producer element P0. If that is not the case (i.e. the flag has not been updated), then the subsequent branch instruction branches back to the wait for event, which will then cause processor P1 to go to sleep until an event is detected. As noted above, an indication from the exclusive monitor when a processing element has written to the flag will be treated as such an event, and will cause the processor P1 to wake up and thereafter continue with execution of the LDAXR and subsequent instructions.

However, if the comparison operation determines that the flag has been updated, then processing proceeds to the LDR instruction (instruction number 6 in the sequence), where processor P1 proceeds to load the payload data.

As can be seen from the description of the above code, the aim of the code is that the producer processing element writes some payload data and then uses an ordered write to a flag. The memory model of the architecture can be used to ensure that the payload is observed before the flag. The consumer processing element then uses ordered loads to read the flag first, and if the flag has been updated then reads the payload.

It is common for the above-mentioned two threads to run on different processing elements in the system, each with their own private caches (in addition to any shared cache). When the producer processing element writes to the payload, it may be required to make a unique copy of the cache line containing the payload meaning that all the other private caches will have their copy of the data invalidated (including for example any copy that the consumer processing element P1 currently has). When that consumer processing element eventually reads the payload as a result of the above described instruction sequence the data must be moved from the cache of the producer processing element to the cache of the consumer processing element, which increases the latency of the sequence.

However, by using the earlier-mentioned stashee hint instruction to enable the consumer processing element to register its interest in reading the data, the latency can be significantly reduced. For instance, in one example the above-mentioned code sequence for the processor P1 may be modified as follows:

P1:
    (1) SEVL
    (1.1) PRFM IR <payload>
    (2) WFE
    (3) LDAXR <flag>
    (4) CMP <flag>, <expected value>; test to see if flag has been updated
    (5) B.NE <2>; branch back to WFE (and wait) if flag not updated
    (6) LDR <payload>

In this code sequence, the stashee hint instruction is the PRFM IR instruction (with the IR signifying an intent to read). The rest of the code sequence is unchanged, and operates in the same way as discussed above. However, by virtue of the use of the stashee hint instruction, there is a likelihood that when the producer processing element stores the payload, that payload will be stashed within the private cache of processing element P1. As a result, when the final load instruction is executed to load the payload, there should be a significantly reduced latency when compared with the earlier discussed sequence, since a hit will be detected in processor P1's private cache for the payload.

An alternative option for the above code sequences as follows:

P1:
   (1) SEVL
   (2) WFE
   (3) LDAXR <flag>
   (4) CMP <flag>, <expected value>; test to see if flag has been updated
   (4.1) B.EQ <6>; branch over the intent-to-read if the flag has been set
   (4.2) PRFM IR <payload>
   (5) B.NE <2>; branch back to WFE (and wait) if flag not updated
   (6) LDR <payload>

As will be apparent from a comparison of this code with the earlier example code, the difference here is that the registering of the intent to read is not always performed, but instead is only performed if, on first reading of the flag, it is determined that the flag has not been updated yet. This can hence provide a more optimal implementation, as it avoids the need to always execute the PRFM IR instruction. In particular, as will be seen, if when the comparison of the flag with the expected value takes place, it is determined that the flag has been updated, then the subsequent branch equal instruction causes a branch directly to the final load instruction to load the payload. In particular, there is no need to execute the PRFM IR instruction if the payload data is already available to read. However, if the flag has not been updated, then instead the PRFM IR (stashee hint) instruction is executed, and then processing returns to the wait for event in the same manner as discussed earlier. This should then yield the earlier discussed latency improvements, since when processor P0 does update the data, that updated data should be stashed in the private cache of processor P1, hence resulting in a cache hit when the load payload instruction is subsequently executed.

Figure 11:
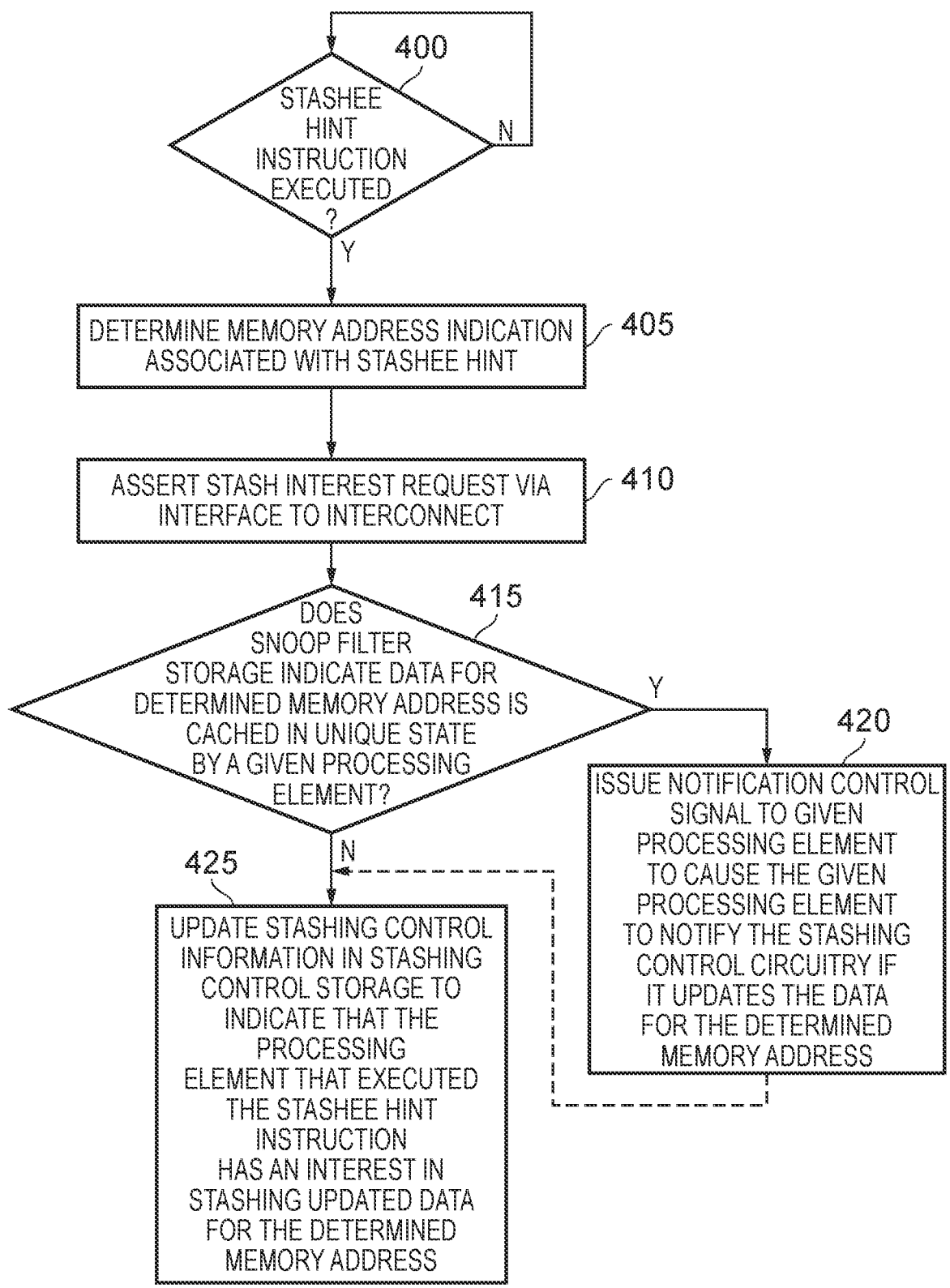
FIG. 11 is a flow diagram illustrating steps that may be performed upon detection of a stashee hint instruction.

FIG. 11 is a flow diagram illustrating steps taken upon execution of a stashee hint instruction in accordance with one example. When at step 400 a stashee hint instruction is executed, then the memory address indication associated with that stashee hint instruction is determined at step 405 (in the same way as discussed earlier with reference to step 205 of FIG. 5) and then at step 410 a stash interest request is asserted via the interface of the consumer processing element to the interconnect 50.

At step 415, it is determined with reference to the snoop filter storage whether the data for the determined memory address is cached in a unique state by any processing element. If it is, then the process proceeds to step 420, where a notification control signal is issued to the given processing element that is holding the data in the unique state, to instruct the given processing element to notify the stashing control circuitry 55 if it updates the data for the determined memory address in due course. This will ensure that an update does not occur to the data without the stashing control circuitry being notified.

If at step 415 it is determined that there is no processing element holding a copy of the data for the determined memory address in the unique state, then the processing proceeds to step 425, where the stashing control information is updated in the stashing control storage 60 to indicate that the processing element that executed the stashee hint instruction at step 400 has an intent in stashing the updated data for the determined memory address.

As shown by the dotted line in FIG. 11, following step 420 the process can also proceed to step 425 if it is considered desirable to additionally update the stashing control information, in addition to notifying the processing element that is currently holding a copy of the data in the unique state. For instance, it may be considered appropriate to retain that information, so that the stashing control circuitry can refer to it later when the data is updated. However, in other instances that may not be necessary. For example, if the above-mentioned notification control signal sent to the processing element currently caching the data in the unique state not only indicated that that processing element should notify the stashing control circuitry when it generates updated data for the memory address in question, but also identifies that that processing element should identify when providing the updated data the processing element that is the target for stashing (this information could for example be provided to that processing element as part of the original notification sent from the stashing control circuitry), this may enable the stashing control circuitry to have sufficient information to identify which processing element to make the updated data available to for stashing without needing to reference the stashing control storage.

Figure 12:
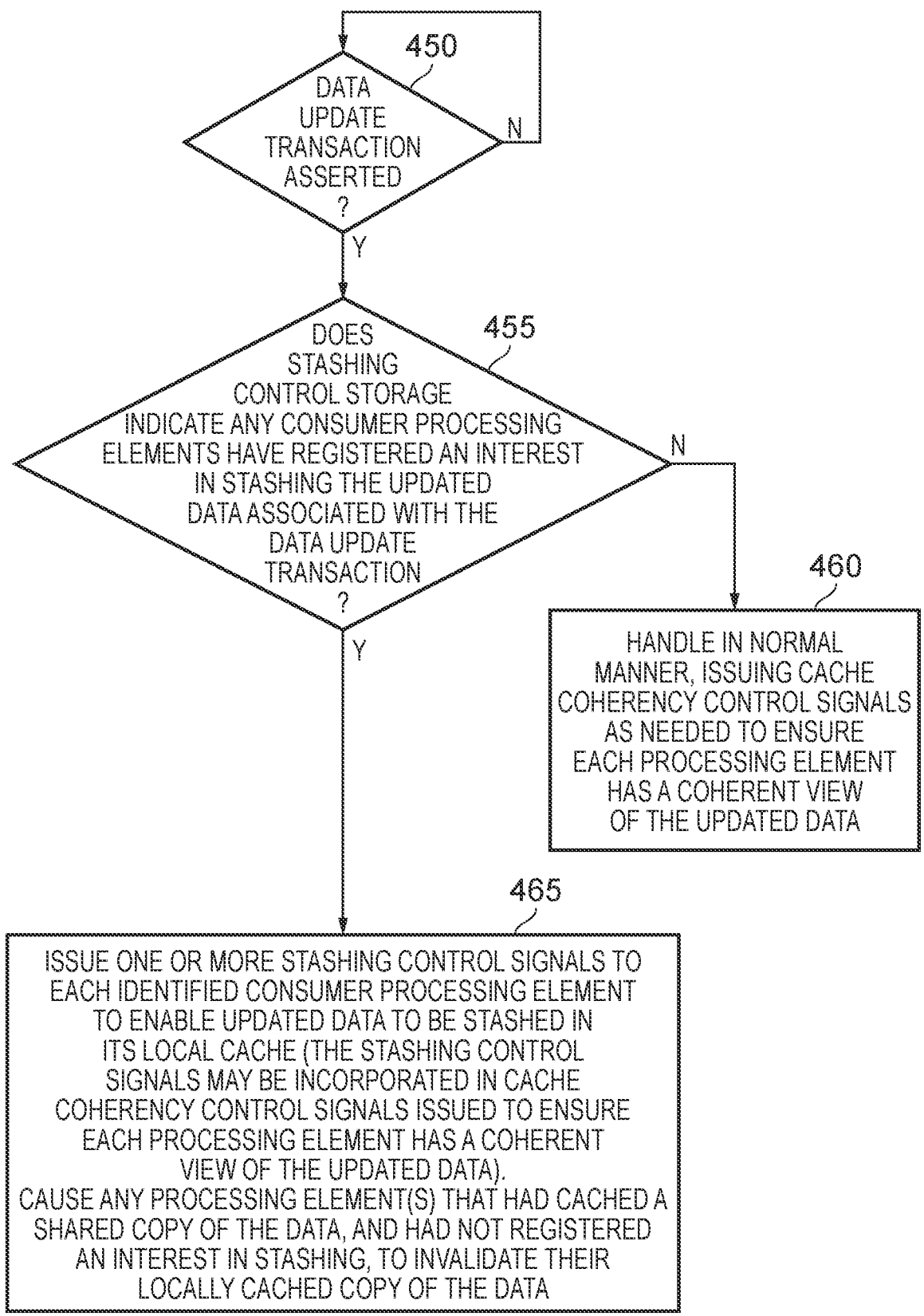
FIG. 12 is a flow diagram illustrating steps that may be performed upon detection of a data update transaction.

FIG. 12 is a flow diagram indicating steps taken when a data update transaction is asserted at step 450 from a producer processing element to the interconnect 50. It should be noted that whilst this data update transaction could be a modified data update transaction as discussed earlier with reference to FIG. 3 (due to the use of the earlier discussed stash hint instruction by the producer processing element), this is not a requirement, and a standard data update transaction may be asserted at step 450.

Once a data update transaction is asserted, then at step 455 the stashing control circuitry determines whether the stashing control storage indicates that any consumer processing elements have registered an interest in stashing the updated data associated with the data update transaction. If not, the process merely proceeds to step 460 where the data update transaction is handled in the normal manner, with the coherency management circuitry 65 issuing cache coherency control signals as needed to ensure that each processing element has a coherent view of the updated data.

However, if at step 455 it is determined that there is at least one consumer processing element that has registered an interest in stashing the updated data, then the process proceeds to step 465 where one or more stashing control signals are issued to each consumer processing element identified at step 455, to enable the updated data to be stashed in the local cache of each such consumer processing element. As discussed earlier, the stashing control signals may be incorporated in cache coherency control signals issued to ensure that each processing element has a coherent view of the updated data. In one example implementation, if there is any processing element that the snoop filter storage 70 indicates may be caching a copy of the data being updated, but which has not registered an interest in stashing, then the coherency management circuitry 65 can be arranged to issue cache coherency control signals to that processing element to cause it to invalidate its locally cached copy of the data.

Figure 13:
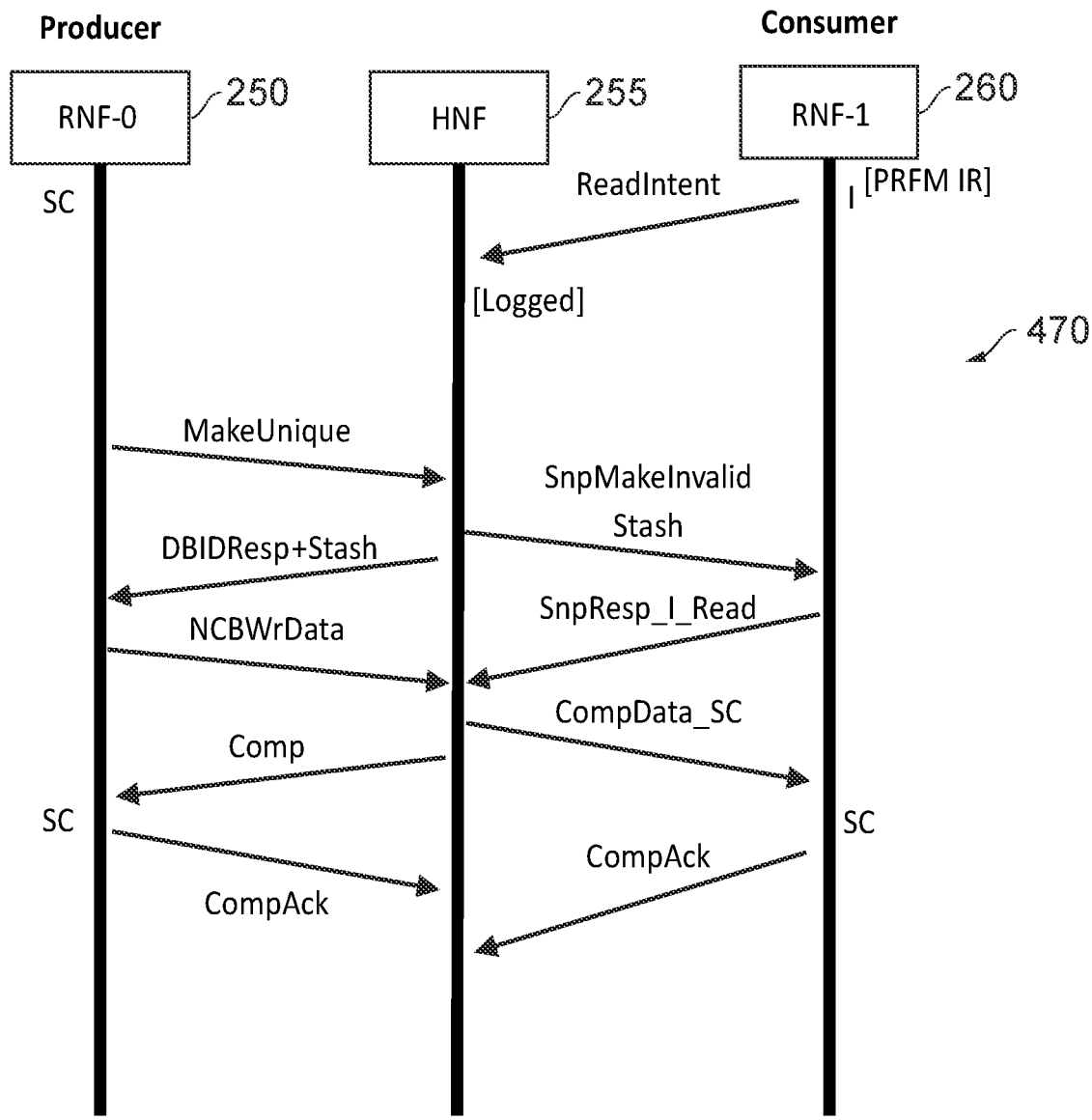
FIGS. 13 and 14 are diagrams illustrating the interactions that may occur between components of a system when adopting techniques described herein.
Figure 14:
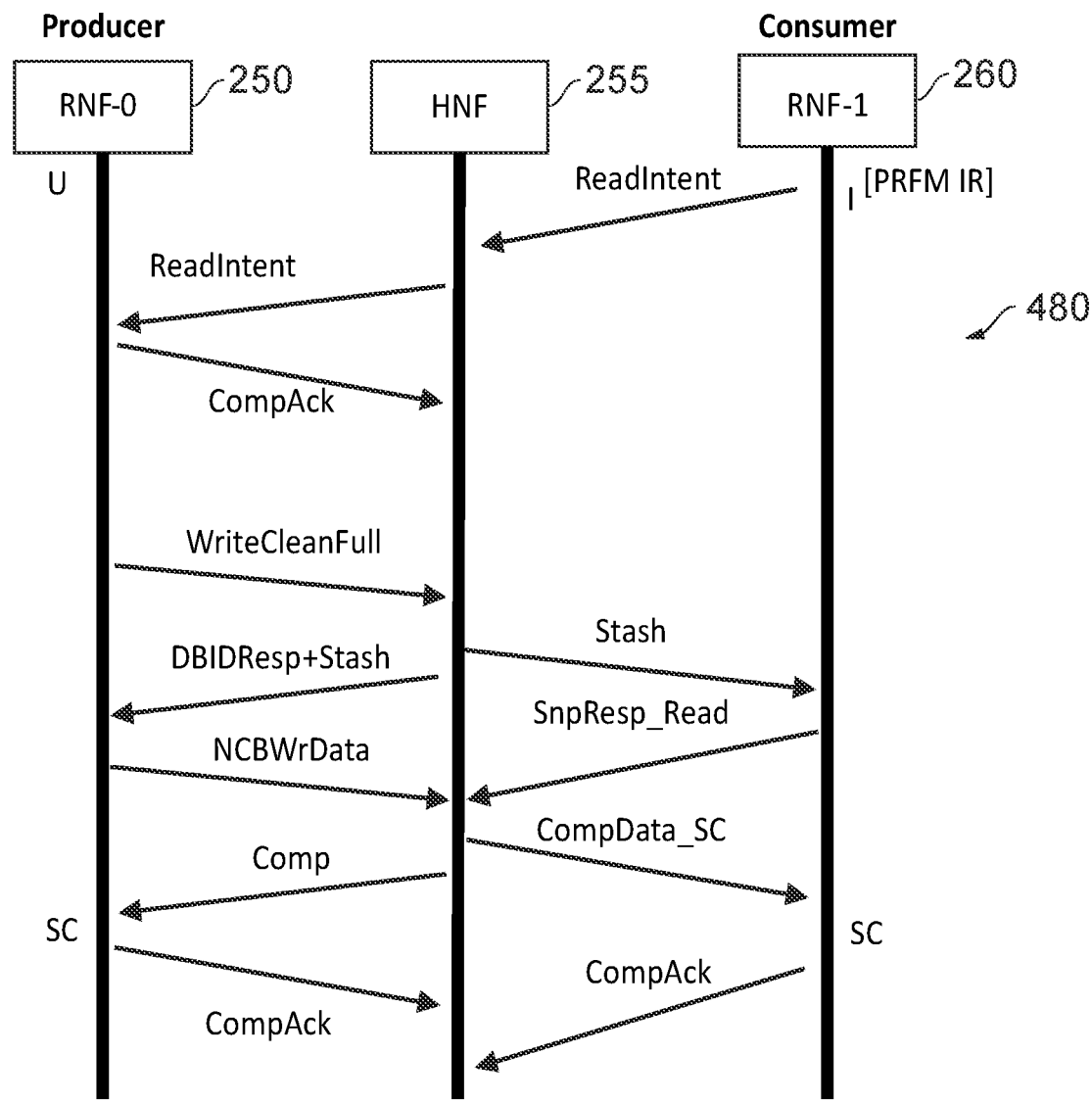

FIGS. 13 and 14 are diagrams illustrating the interactions that may occur between components of the system when adopting techniques described herein. As shown by the sequence 470 in FIG. 13, consumer processing element 260 may execute the earlier mentioned stashee hint instruction in order to cause a stash interest request to be issued to the home node 255, as indicated by the ReadIntent signal in the sequence 470. The stashing control circuitry 55 at the home node then maintains within the stashing control storage 60 stashing control information to identify that the consumer processing element 260 is interested in stashing the data for the address indicated in the stash interest request signal. In the example shown in FIGS. 13 and 14, it is assumed that the consumer processing element 260 has at this point invalidated its copy of the data. For example, it may be the case that the consumer processing element 260 previously had a shared copy of the data, but invalidated that copy on issuing the ReadIntent signal because it then knew as a result of executing the stashee hint instruction that its copy of the data was stale.

In due course, it is assumed that the producer processing element 250, which currently holds a copy of the data in question in the shared clean (SC) state, wishes to update that data by performing a write operation. In this example, in contrast to the earlier discussed examples of FIGS. 6 to 10, it is assumed that the producer processing element does not execute a stash hint instruction, and instead merely performs a standard write operation. In accordance with the cache coherency protocol employed in this example, it is assumed that the producer processing element needs to obtain the data in unique state before it is able to perform the write operation, and accordingly issues a MakeUnique request signal to the home node. Due to the registering of the intent to read by the consumer processing element 260, then at this point the home node can treat the request from the producer processing element in the same way as the original request issued by the producer processing element 250 in the example sequence 280 of FIG. 6, and the sequence of signals then proceeds in exactly the same way as discussed earlier with reference to the sequence 280 of FIG. 6, with one modification. In particular, the DBIDResp signal sent from the home node 255 to the producer processing element 250 includes a stash indication to inform the producer that it needs to supply the update data, thus notifying the producer processing element of the intention to stash the updated data in the consumer processing element's cache. The sequence 470 results in the updated data not only being stored in the producer processing element's cache but also being stashed in the consumer processing element's cache, with both caches storing the data in the shared clean state.

FIG. 14 illustrates a similar scenario to FIG. 13, but in a situation where the producer processing element 250 currently holds a copy of the data in question in the unique state. As per the earlier discussion of step 420 of FIG. 11, when the "ReadIntent" signal is received by the home node 255 from the consumer processing element 260, it is propagated on to the producer processing element 250 to notify the producer processing element 250 that it needs to inform the home node 255 if it updates the data, the producer processing element 250 sending an acknowledgement signal to confirm receipt of that information.

Hence, when the producer processing element 250 does subsequently update the data, it issues a data update transaction to the home node 255, as indicated by the "WriteCleanFull" request signal shown in the sequence 480 of FIG. 14. This causes the home node 255 to interact with the producer processing element 250 in the same way as discussed earlier with reference to FIG. 13. In addition, a stash signal is sent to the consumer processing element 260 to give the consumer processing element the opportunity to stash the updated data. In the example of FIG. 14, it is assumed that the consumer processing element wishes to do that, and accordingly issues the snoop response signal with a "read" suffix to denote that it does wish to stash the updated data. In the same way as discussed with reference to the earlier figures, this then results in the provision of the updated data from the home node 255 to the consumer processing element 260, and, as with the example of FIG. 13, at the end of the sequence shown both the producer processing element 250 and the consumer processing element 260 hold in their local caches an updated version of the data in the shared clean state.

Figure 15A:
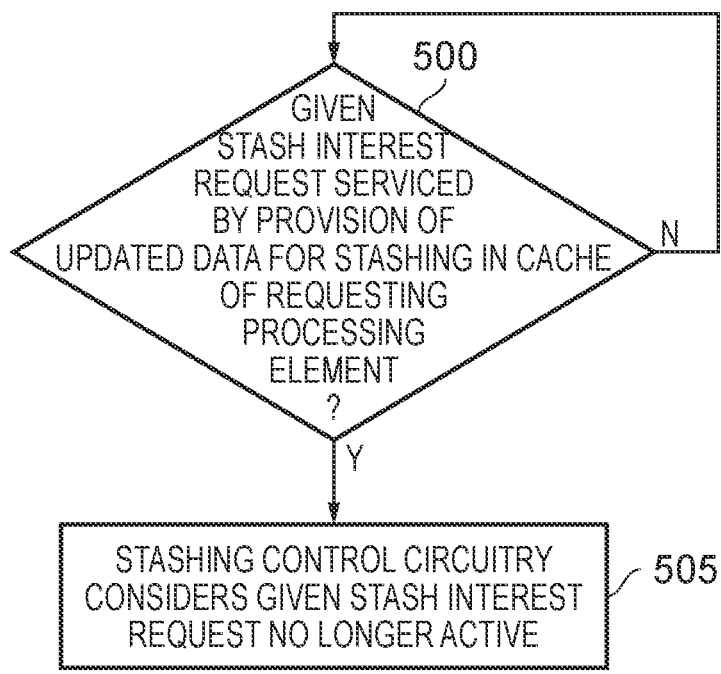
FIGS. 15A and 15B illustrate two mechanisms that may be used to determine whether a stash interest request is to be considered no longer active.
Figure 15B:
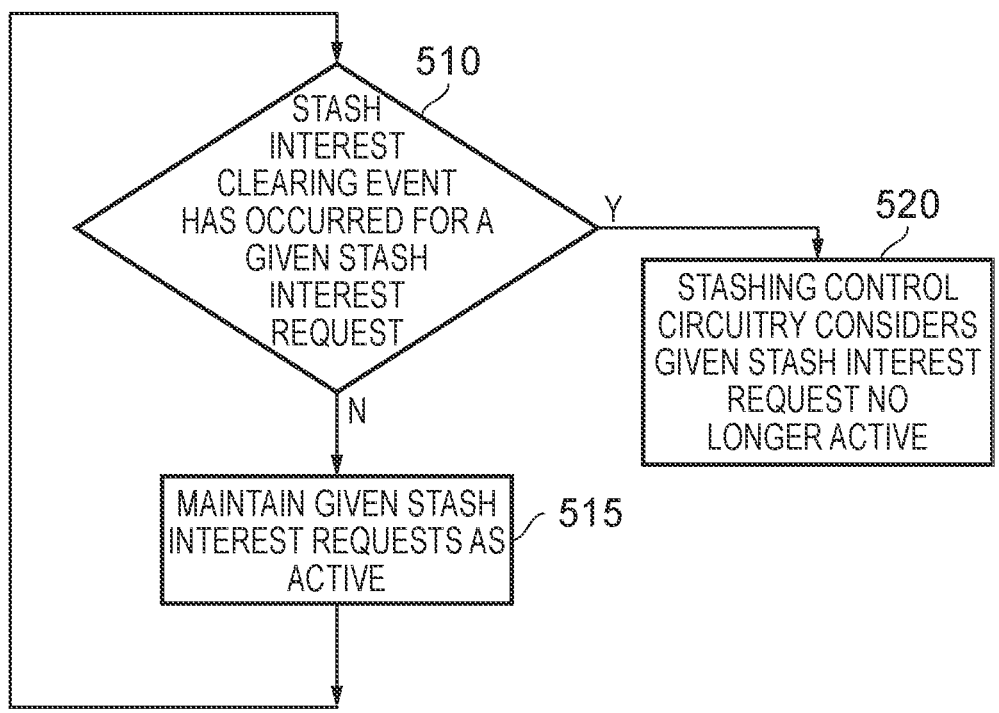

Once a stash interest request has been issued, there are various ways in which the registration of that interest can be deactivated. FIGS. 15A and 15B illustrate two example approaches. As shown in FIG. 15A, when a given stash interest request is determined at step 500 to have been serviced by provision of updated data for stashing in the cache of the requesting processing element (i.e. the processing element that had issued the original stash interest request), then in this example it is assumed that the stash interest request is no longer active, and should be deregistered (as indicated by the step 505). Hence, any given stash interest request is considered to apply to one stashing event and hence the stashee registration will be cleared when the updated data has been made available for stashing once. However, in an alternative implementation each stash interest request may be considered to be active for multiple stashing events and only cleared once those multiple stashing events have occurred.

As shown in FIG. 15B, another alternative approach is for the stash interest request to be considered as active until a stash interest clearing event occurs. As shown at step 510 of FIG. 15B, it is determined whether a stash interest clearing event has occurred for a given stash interest request, and if not then at step 515 the stash interest request is maintained as active. However, once the stash interest clearing event has been detected at step 510, the process proceeds to step 520 where the stashing control circuitry considers the given stash interest request as no longer being active and deregisters that interest.

The stash interest clearing event can take a variety of forms. For example, the stash interest clearing event may comprise receipt by the stashing control circuitry 55 of a stash interest removal request from the relevant processing circuitry providing an indication of the memory address for which stashing is no longer of interest. For instance, the relevant processing circuitry (i.e. the one that had previously issued the stash interest request) may be able to execute a stash interest clearing instruction that causes the stash interest removal request to be generated. In other instances, the stash interest clearing event may arise without any notification from the relevant processing circuitry. Purely by way of example, the stashing control storage 60 used to maintain stashing control information may be of a fixed size, and when new stashing control information is received then, if necessary, older stashing control information within the stashing control storage may be discarded to make room for the new stashing control information. In one particular example implementation, the stashing control storage may be arranged as a FIFO, such that the oldest stashing control information is the first to be discarded. Hence, if a given processing element has issued a stash interest request, causing an associated item of stashing control information to be added to the FIFO, but the updated data has not become available by the time that item of stashing control information needs to be discarded to make room for new stashing control information, then the discarding of the item of stashing control information for that stash interest request can be considered to be the stash interest clearing event.

It should be noted that the discarding of stashing control information does not affect correct operation since the only side effect of discarding the stashing control information is that the relevant updated data may not be stashed in a cache of the target processing element that may wish to use that updated data, and instead that target processing element will need to obtain the updated data in due course from the memory system when required (just resulting in a longer latency than would have been the case had the data been stashed).

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and System Verilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc.

An integrated circuit fabricated using the computer-readable code may comprise components such as one or more of a central processing unit, graphics processing unit, neural processing unit, digital signal processor or other components that individually or collectively embody the concept.

Figure 16:
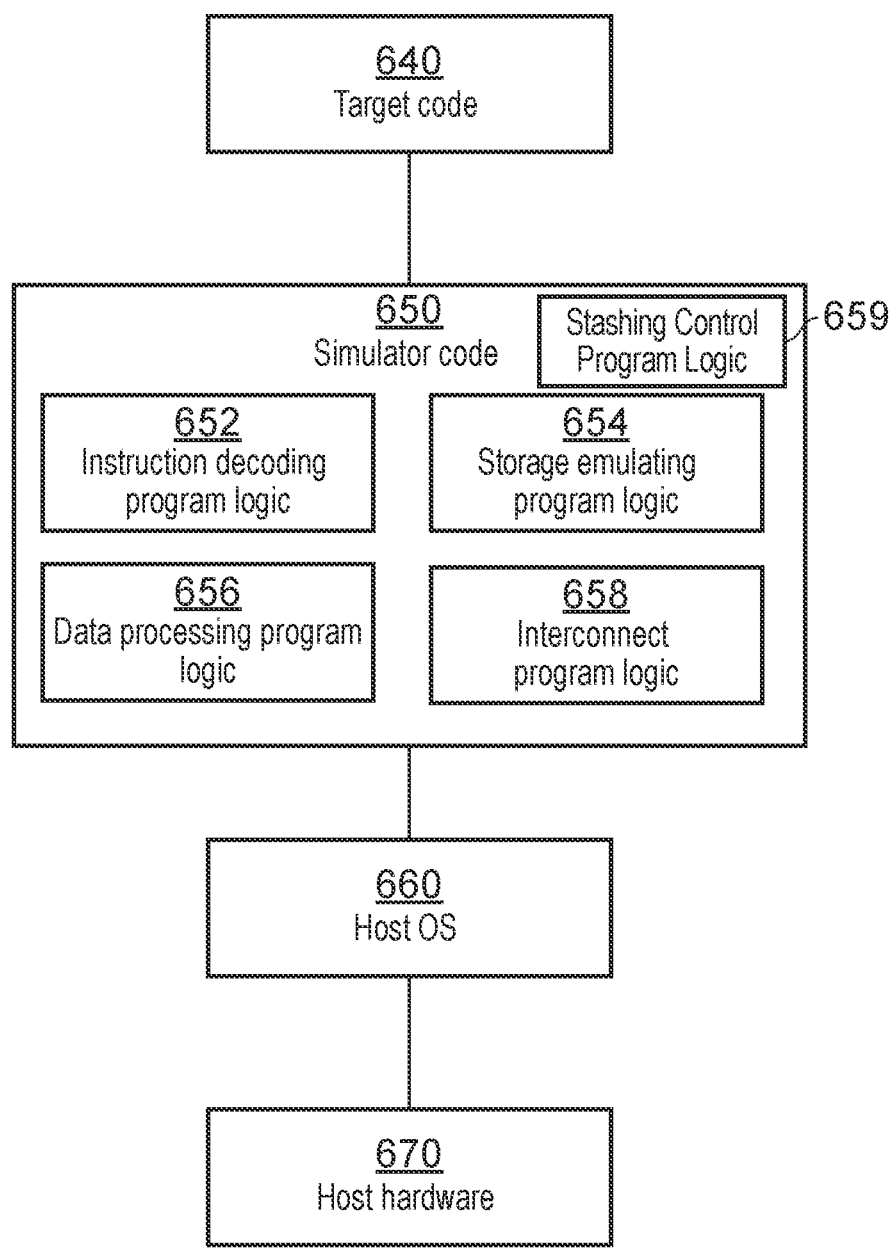
FIG. 16 illustrates a simulator implementation.

FIG. 16 illustrates a simulator implementation that may be used. Whilst the earlier described embodiments implement the described techniques in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators.

Typically, a simulator implementation may run on a host processor 670, optionally running a host operating system 660, supporting the simulator program 650. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 670), some simulated embodiments may make use of the host hardware, where suitable.

For example, the simulator code 650 may include instruction decoding program logic 652 to decode instructions in the target code-hence, the instruction decoding program logic may emulate the instruction decoder circuitry 12 described earlier. The simulator program may also include data processing program logic 656 to process instructions in the target code 640 (and hence emulate processing circuitry 14). In addition, the simulator code 650 may provide stashing control program logic 659 to handle stashing of updated data (and hence emulate the stashing control circuitry 55), interconnect program logic 658 to emulate the interconnect circuitry 50, and storage emulating program logic 654 to emulate an associated storage structure (for example a cache) of one or more processing elements.

The simulator program 650 may be stored on a computer-readable storage medium (which may be a non-transitory medium), and provides a program interface (instruction execution environment) to the target code 640 (which may include applications, operating systems and a hypervisor) which is the same as the interface of the hardware architecture being modelled by the simulator program 650. Thus, the program instructions of the target code 640, including the earlier-mentioned stash hint instructions and/or stashee hint instructions, may be executed from within the instruction execution environment using the simulator program 650, so that a host computer 670 which does not actually have the hardware features of the apparatus discussed above can emulate these features.

Some example configurations are set out in the following numbered clauses:

1. An apparatus comprising:
    decoder circuitry within a first processing element to decode instructions, wherein the decoder circuitry is responsive to a sequence of instructions to generate control signals;
    processing circuitry within the first processing element that is responsive to the control signals to perform operations defined by the sequence of instructions; and
    an interface to couple the first processing element to interconnect circuitry;
    wherein:
    the decoder circuitry is responsive to a stashee hint instruction in the sequence of instructions to issue control signals to cause the processing circuitry to issue a stash interest request via the interface, wherein the stash interest request is arranged to provide a given memory address indication determined from the stashee hint instruction and to trigger stashing control circuitry accessible via the interconnect circuitry to cause updated data associated with the given memory address indication to be made available for stashing in an associated storage structure of the first processing element.

2. An apparatus as in Clause 1, further comprising:
    the stashing control circuitry arranged, following receipt of the stash interest request, to be responsive to a data update transaction initiated by a further processing element coupled to the interconnect circuitry indicating that the updated data is being generated, to issue one or more stashing control signals to the first processing element to enable the updated data to be stashed in the associated storage structure of the first processing element.

3. An apparatus as in Clause 2, further comprising:
    a stashing control storage to maintain stashing control information for reference by the stashing control circuitry, wherein the stashing control storage is arranged to maintain, as the stashing control information, one or more memory address indications and, for each memory address indication, an indication of one or more processing elements coupled to the interconnect circuitry that have an associated storage structure and have registered an interest in having the data associated with that memory address indication stashed in their associated storage structure; and
    the stashing control circuitry is arranged to reference the stashing control storage to determine, for a given item of updated data, whether any processing elements coupled to the interconnect circuitry should be sent stashing control signals to enable that given item of updated data to be stashed in their associated storage structure.

4. An apparatus as in Clause 3, wherein the stashing control circuitry is responsive to the stash interest request issued by the processing circuitry of the first processing element, to cause the stashing control information maintained in the stashing control storage to be updated to identify that, for the given memory address indication, the first processing element has registered an interest in having the data associated with that given memory address indication stashed in its associated storage structure.

5. An apparatus as in any of clauses 2 to 4, wherein:
    the stashing control circuitry is arranged, responsive to the stash interest request, to determine whether any processing element coupled to the interconnect circuitry is a candidate processing element for generating the updated data without the stashing control circuitry being aware, and in that event to issue a notification control signal to the candidate processing element identifying that, in the event that candidate processing element causes the updated data to be generated, the candidate processing element is to notify the stashing control circuitry to enable the updated data to be made available for stashing in the associated storage structure of the first processing element.

6. An apparatus as in Clause 5, wherein the stashing control circuitry is arranged to identify as the candidate processing element a processing element that is understood to be storing in its associated storage structure a copy of data associated with the given memory address indication in a unique state indicating that the candidate processing element is the only processing element coupled to the interconnect circuitry that is storing in its associated storage structure a valid copy of data associated with the given memory address indication.

7. An apparatus as in any preceding clause when dependent on Clause 2, further comprising:
    the interconnect circuitry to interconnect a plurality of processing elements that are coupled to the interconnect circuitry, the plurality of processing elements comprising at least the first processing element and the further processing element;
    wherein:
    multiple processing elements amongst the plurality of processing elements have associated storage structures;
    the interconnect circuitry has coherency management circuitry to maintain coherency of data accessible by the multiple processing elements; and
    the stashing control circuitry is associated with the coherency management circuitry to cause the one or more stashing control signals to be integrated with coherency control signals issued by the coherency management circuitry to maintain coherency for the updated data.

8. An apparatus as in Clause 7, further comprising:
    coherency control storage used to maintain a record, for each memory address of a plurality of memory addresses, of which associated storage structures may be storing a copy of the data associated with that memory address;
    wherein:
    the coherency management circuitry is arranged, responsive to determining with reference to the coherency control storage that a given processing element may have a copy of data associated with a memory address identified by the data update transaction, to issue a snoop request signal to the given processing element to cause a coherency action to be taken by the given processing element; and when the stashing control circuitry determines that the given processing element is the first processing element and has issued the stash interest request, the coherency management circuitry is arranged to incorporate a stashing indication within the snoop request signal to enable the updated data to be stashed in the associated storage structure of the first processing element.

9. An apparatus as in Clause 8, wherein the stashing control circuitry is arranged, responsive to the stash interest request, to determine with reference to the coherency control storage, whether there is a given processing element coupled to the interconnect circuitry that is understood to be storing in its associated storage structure a copy of data associated with the given memory address indication in a unique state indicating that the given processing element is the only processing element coupled to the interconnect circuitry that is storing in its associated storage structure a valid copy of data associated with the given memory address indication, and in that event to issue a notification control signal to the given processing element identifying that, in the event that the given processing element causes the updated data to be generated, the given processing element is to notify the stashing control circuitry to enable the updated data to be made available for stashing in the associated storage structure of the first processing element.

10. An apparatus as in Clause 8 or Clause 9, wherein the coherency control storage is further arranged to provide stashing control storage used to maintain stashing control information for reference by the stashing control circuitry.

11. An apparatus as in any of clauses 2 to 9, wherein the stashing control circuitry is arranged to send a data request signal to the further processing element in response to the data update transaction to cause the further processing element to make the updated data available for provision to the first processing element for stashing in its associated storage structure.

12. An apparatus as in any preceding clause, wherein the first processing element is enabled to execute a sequence of instructions that includes multiple instances of the stashee hint instruction, each instance having an associated memory address indication, to thereby cause stash interest requests to be issued to trigger the stashing control circuitry to cause updated data associated with each of the associated memory address indications to be made available for stashing in the associated storage structure of the first processing element.

13. An apparatus as in any preceding clause, further comprising at least one additional processing element that is enabled to execute the stashee hint instruction, and the stashing control circuitry is arranged to be responsive to each stash interest request issued by any of the first processing element and the at least one additional processing element to cause updated data associated with a memory address indication provided by that stash interest request to be made available for stashing in an associated storage structure of the processing element issuing that stash interest request.

14. An apparatus as in any preceding clause, wherein each associated storage structure is a cache used to cache data for access by each processing element that has access to that associated storage structure.

15. An apparatus as in any preceding clause, wherein the stashing control circuitry is arranged to consider the stash interest request no longer active once the updated data associated with the given memory address indication has been made available for stashing in the associated storage structure of the first processing element.

16. An apparatus as in any of clauses 1 to 14, wherein the stashing control circuitry is arranged to consider the stash interest request as active until a stash interest clearing event occurs.

17. An apparatus as in Clause 16, wherein the stash interest clearing event comprises receipt by the stashing control circuitry of a stash interest removal request from the first processing circuitry providing the given memory address indication.

18. A method of controlling stashing of data, comprising:
decoding a sequence of instructions within decoder circuitry of a first processing element in order to generate control signals;
responsive to the control signals, performing within processing circuitry of the first processing element operations defined by the sequence of instructions;
in response to a stashee hint instruction in the sequence of instructions, issuing from the decoder circuitry control signals that cause the processing circuitry to issue a stash interest request via an interface used to couple the first processing element to interconnect circuitry, wherein the stash interest request provides a given memory address indication determined from the stashee hint instruction; and
in response to the stash interest request, triggering stashing control circuitry accessible via the interconnect circuitry to cause updated data associated with the given memory address indication to be made available for stashing in an associated storage structure of the first processing element.

19. A computer program comprising instructions which, when executed by a host data processing apparatus, control the host data processing apparatus to provide an instruction execution environment for executing target program code, the computer program comprising:
instruction decoding program logic associated with a first processing element to decode instructions, wherein the instruction decoding program logic is responsive to a sequence of instructions to generate control signals; and
data processing program logic associated with the first processing element to be responsive to the control signals to perform operations defined by the sequence of instructions;
wherein:
the instruction decoding program logic is responsive to a stashee hint instruction in the sequence of instructions to issue control signals to cause the data processing program logic to issue a stash interest request to interconnect program logic, wherein the stash interest request is arranged to provide a given memory address indication determined from the stashee hint instruction, and to trigger stashing control program logic accessible via the interconnect program logic to cause updated data associated with the given memory address indication to be made available for stashing in storage emulating program logic used to emulate an associated storage structure of the first processing element.

20. A computer-readable medium storing computer-readable code for fabrication of the apparatus of any of clauses 1 to 17.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
decoder circuitry within a first processing element and arranged to decode instructions, wherein the decoder circuitry is responsive to a sequence of instructions to generate control signals;
processing circuitry within the first processing element that is responsive to the control signals to perform operations defined by the sequence of instructions; and
an interface arranged to couple the first processing element to interconnect circuitry;
wherein:
the decoder circuitry is responsive to a stashee hint instruction in the sequence of instructions to issue control signals to cause the processing circuitry to issue a stash interest request via the interface, wherein the stash interest request is arranged to provide a given memory address determined from the stashee hint instruction and to trigger stashing control circuitry accessible via the interconnect circuitry to cause updated data associated with the given memory address indication to be made available for stashing in an associated storage structure of the first processing element.

2. An apparatus as claimed in claim 1, further comprising:
the stashing control circuitry arranged, following receipt of the stash interest request, to be responsive to a data update transaction initiated by a further processing element coupled to the interconnect circuitry indicating that the updated data is being generated, to issue one or more stashing control signals to the first processing element to enable the updated data to be stashed in the associated storage structure of the first processing element.

3. An apparatus as claimed in claim 2, further comprising:
a stashing control storage to maintain stashing control information for reference by the stashing control circuitry, wherein the stashing control storage is arranged to maintain, as the stashing control information, one or more memory address indications and, for each memory address indication, an indication of one or more processing elements coupled to the interconnect circuitry that have an associated storage structure and have registered an interest in having the data associated with that memory address indication stashed in their associated storage structure; and
the stashing control circuitry is arranged to reference the stashing control storage to determine, for a given item of updated data, whether any processing elements coupled to the interconnect circuitry should be sent stashing control signals to enable that given item of updated data to be stashed in their associated storage structure.

4. An apparatus as claimed in claim 3, wherein the stashing control circuitry is responsive to the stash interest request issued by the processing circuitry of the first processing element, to cause the stashing control information maintained in the stashing control storage to be updated to identify that, for the given memory address indication, the first processing element has registered an interest in having the data associated with that given memory address indication stashed in its associated storage structure.

5. An apparatus as claimed in claim 2, wherein:
the stashing control circuitry is arranged, responsive to the stash interest request, to determine whether any processing element coupled to the interconnect circuitry is a candidate processing element for generating the updated data without the stashing control circuitry being aware, and in that event to issue a notification control signal to the candidate processing element identifying that, in the event that candidate processing element causes the updated data to be generated, the candidate processing element is to notify the stashing control circuitry to enable the updated data to be made available for stashing in the associated storage structure of the first processing element.

6. An apparatus as claimed in claim 5, wherein the stashing control circuitry is arranged to identify as the candidate processing element a processing element that is understood to be storing in its associated storage structure a copy of data associated with the given memory address indication in a unique state indicating that the candidate processing element is the only processing element coupled to the interconnect circuitry that is storing in its associated storage structure a valid copy of data associated with the given memory address indication.

7. An apparatus as claimed in claim 2, further comprising:
the interconnect circuitry to interconnect a plurality of processing elements that are coupled to the interconnect circuitry, the plurality of processing elements comprising at least the first processing element and the further processing element;
wherein:
multiple processing elements amongst the plurality of processing elements have associated storage structures;
the interconnect circuitry has coherency management circuitry to maintain coherency of data accessible by the multiple processing elements; and the stashing control circuitry is associated with the coherency management circuitry to cause the one or more stashing control signals to be integrated with coherency control signals issued by the coherency management circuitry to maintain coherency for the updated data.

8. An apparatus as claimed in claim 7, further comprising:
coherency control storage used to maintain a record, for each memory address of a plurality of memory addresses, of which associated storage structures may be storing a copy of the data associated with that memory address;
wherein:
the coherency management circuitry is arranged, responsive to determining with reference to the coherency control storage that a given processing element may have a copy of data associated with a memory address identified by the data update transaction, to issue a snoop request signal to the given processing element to cause a coherency action to be taken by the given processing element; and
when the stashing control circuitry determines that the given processing element is the first processing element and has issued the stash interest request, the coherency management circuitry is arranged to incorporate a stashing indication within the snoop request signal to enable the updated data to be stashed in the associated storage structure of the first processing element.

9. An apparatus as claimed in claim 8, wherein the stashing control circuitry is arranged, responsive to the stash interest request, to determine with reference to the coherency control storage, whether there is a given processing element coupled to the interconnect circuitry that is understood to be storing in its associated storage structure a copy of data associated with the given memory address indication in a unique state indicating that the given processing element is the only processing element coupled to the interconnect circuitry that is storing in its associated storage structure a valid copy of data associated with the given memory address indication, and in that event to issue a notification control signal to the given processing element identifying that, in the event that the given processing element causes the updated data to be generated, the given processing element is to notify the stashing control circuitry to enable the updated data to be made available for stashing in the associated storage structure of the first processing element.

10. An apparatus as claimed in claim 8, wherein the coherency control storage is further arranged to provide stashing control storage used to maintain stashing control information for reference by the stashing control circuitry.

11. An apparatus as claimed in claim 2, wherein the stashing control circuitry is arranged to send a data request signal to the further processing element in response to the data update transaction to cause the further processing element to make the updated data available for provision to the first processing element for stashing in its associated storage structure.

12. An apparatus as claimed in claim 1, wherein the first processing element is enabled to execute a sequence of instructions that includes multiple instances of the stashee hint instruction, each instance having an associated memory address indication, to thereby cause stash interest requests to be issued to trigger the stashing control circuitry to cause updated data associated with each of the associated memory address indications to be made available for stashing in the associated storage structure of the first processing element.

13. An apparatus as claimed in claim 1, further comprising at least one additional processing element that is enabled to execute the stashee hint instruction, and the stashing control circuitry is arranged to be responsive to each stash interest request issued by any of the first processing element and the at least one additional processing element to cause updated data associated with a memory address indication provided by that stash interest request to be made available for stashing in an associated storage structure of the processing element issuing that stash interest request.

14. An apparatus as claimed in claim 1, wherein each associated storage structure is a cache used to cache data for access by each processing element that has access to that associated storage structure.

15. An apparatus as claimed in claim 1, wherein the stashing control circuitry is arranged to consider the stash interest request no longer active once the updated data associated with the given memory address indication has been made available for stashing in the associated storage structure of the first processing element.

16. An apparatus as claimed in claim 1, wherein the stashing control circuitry is arranged to consider the stash interest request as active until a stash interest clearing event occurs.

17. An apparatus as claimed in claim 16, wherein the stash interest clearing event comprises receipt by the stashing control circuitry of a stash interest removal request from the first processing circuitry providing the given memory address indication.

18. A method of controlling stashing of data, comprising:
decoding a sequence of instructions within decoder circuitry of a first processing element in order to generate control signals;
responsive to the control signals, performing within processing circuitry of the first processing element operations defined by the sequence of instructions;
in response to a stashee hint instruction in the sequence of instructions, issuing from the decoder circuitry control signals that cause the processing circuitry to issue a stash interest request via an interface used to couple the first processing element to interconnect circuitry, wherein the stash interest request provides a given memory address indication determined from the stashee hint instruction; and
in response to the stash interest request, triggering stashing control circuitry accessible via the interconnect circuitry to cause updated data associated with the given memory address indication to be made available for stashing in an associated storage structure of the first processing element.

19. A non-transitory computer-readable medium storing a computer program comprising instructions which, when executed by a host data processing apparatus, control the host data processing apparatus to provide an instruction execution environment for executing target program code, the computer program comprising:
instruction decoding program logic associated with a first processing element to decode instructions, wherein the instruction decoding program logic is responsive to a sequence of instructions to generate control signals; and
data processing program logic associated with the first processing element to be responsive to the control signals to perform operations defined by the sequence of instructions;
wherein:
the instruction decoding program logic is responsive to a stashee hint instruction in the sequence of instructions to issue control signals to cause the data processing program logic to issue a stash interest request to interconnect program logic, wherein the stash interest request is arranged to provide a given memory address indication determined from the stashee hint instruction, and to trigger stashing control program logic accessible via the interconnect program logic to cause updated data associated with the given memory address indication to be made available for stashing in storage emulating program logic used to emulate an associated storage structure of the first processing element.

* * * * *